United States Patent
Haven et al.

(10) Patent No.: US 11,797,449 B2
(45) Date of Patent: *Oct. 24, 2023

(54) PROVIDING A DYNAMIC DIGITAL CONTENT CACHE

(71) Applicant: Dropbox, Inc., San Francisco, CA (US)

(72) Inventors: Drew Haven, San Francisco, CA (US); Anna Geiduschek, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/504,254

(22) Filed: Oct. 18, 2021

(65) Prior Publication Data
US 2022/0050778 A1 Feb. 17, 2022

Related U.S. Application Data

(63) Continuation of application No. 16/227,849, filed on Dec. 20, 2018, now Pat. No. 11,151,036, which is a
(Continued)

(51) Int. Cl.
*G06F 16/51* (2019.01)
*G06F 12/0813* (2016.01)
(Continued)

(52) U.S. Cl.
CPC ...... *G06F 12/0813* (2013.01); *G06F 12/0811* (2013.01); *G06F 16/51* (2019.01);
(Continued)

(58) Field of Classification Search
CPC .. G06F 12/0811; G06F 16/51; G06F 16/9574; G06F 12/0813; H04L 67/5682;
(Continued)

(56) References Cited

U.S. PATENT DOCUMENTS

| | | | |
|---|---|---|---|
| 4,475,172 A | 10/1984 | Frederiksen | |
| 5,321,520 A | 6/1994 | Inga et al. | |

(Continued)

FOREIGN PATENT DOCUMENTS

| | | | |
|---|---|---|---|
| JP | 2006244221 A | 9/2006 | |
| JP | 2007502092 A | 2/2007 | |

(Continued)

OTHER PUBLICATIONS

Bieber G., et al., "TiDi Browser: A Novel Photo Browsing Technique for Mobile Devices," Proceeding of SPIE, Feb. 15, 2007, vol. 6507, pp. 1-8.

(Continued)

*Primary Examiner* — Merilyn P Nguyen
(74) *Attorney, Agent, or Firm* — Keller Preece PLLC

(57) ABSTRACT

One or more embodiments of a thumbnail caching system dynamically provide a thumbnail cache of digital content items (e.g., photos, videos, audio) to a user on a client device. In particular, the thumbnail caching system provides a thumbnail cache of a digital content collection to a client device such that the thumbnail cache does not exceed a threshold storage limit for the client device. In addition, the thumbnail caching system intelligently adjusts the thumbnails within the thumbnail cache to keep the size of the thumbnail cache within the threshold storage limit irrespective of the number of digital content items stored or added to the digital content collection. Further, the thumbnail caching system can dynamically adjust the size of the thumbnail cache in response to a user adding or removing external data to the client device.

20 Claims, 11 Drawing Sheets

Related U.S. Application Data continuation of application No. 14/927,241, filed on Oct. 29, 2015, now Pat. No. 10,198,355.

(51) Int. Cl.
*G06F 12/0811* (2016.01)
*H04L 67/06* (2022.01)
*H04L 67/568* (2022.01)
*H04L 67/5651* (2022.01)
*H04L 67/5682* (2022.01)

(52) U.S. Cl.
CPC ............ *H04L 67/06* (2013.01); *H04L 67/568* (2022.05); *H04L 67/5651* (2022.05); *H04L 67/5682* (2022.05)

(58) Field of Classification Search
CPC ..... H04L 67/06; H04L 67/01; H04L 67/5651; H04L 67/568
See application file for complete search history.

(56) References Cited

U.S. PATENT DOCUMENTS

| | | | |
|---|---|---|---|
| 5,920,327 A | 7/1999 | Seidensticker, Jr. et al. | |
| 5,983,263 A | 11/1999 | Rothrock et al. | |
| 6,006,231 A | 12/1999 | Popa | |
| 6,122,411 A | 9/2000 | Shen et al. | |
| 6,144,996 A | 11/2000 | Starnes et al. | |
| 6,281,874 B1 | 8/2001 | Sivan et al. | |
| 6,496,206 B1 | 12/2002 | Mernyk et al. | |
| 6,509,900 B1 | 1/2003 | Ohsawa et al. | |
| 6,545,687 B2 | 4/2003 | Scott et al. | |
| 6,549,674 B1 | 4/2003 | Chui et al. | |
| 6,563,517 B1 | 5/2003 | Bhagwat et al. | |
| 6,578,072 B2 | 6/2003 | Watanabe et al. | |
| 6,633,608 B1 | 10/2003 | Miller | |
| 6,738,155 B1 | 5/2004 | Rosenlund et al. | |
| 6,757,684 B2 | 6/2004 | Svendsen et al. | |
| 6,898,601 B2 | 5/2005 | Amado et al. | |
| 7,000,188 B1 | 2/2006 | Eustace | |
| 7,092,118 B2 | 8/2006 | Ferriere | |
| 7,154,621 B2 | 12/2006 | Rodriguez et al. | |
| 7,185,069 B2 | 2/2007 | Cronin, III et al. | |
| 7,369,164 B2 | 5/2008 | Parulski et al. | |
| 7,423,653 B2 | 9/2008 | Gettman et al. | |
| 7,467,160 B2 | 12/2008 | McIntyre | |
| 7,574,653 B2 | 8/2009 | Croney et al. | |
| 7,603,409 B2 | 10/2009 | Kobayashi et al. | |
| 7,737,993 B2 | 6/2010 | Kaasila et al. | |
| 7,818,355 B2 | 10/2010 | Mills et al. | |
| 7,929,027 B2 | 4/2011 | Okamoto et al. | |
| 7,991,837 B1 | 8/2011 | Tahan et al. | |
| 8,078,230 B2 | 12/2011 | Schuler et al. | |
| 8,082,327 B2 | 12/2011 | Schlusser et al. | |
| 8,156,132 B1 | 4/2012 | Kaminski, Jr. | |
| 8,161,179 B2 | 4/2012 | Dote et al. | |
| 8,166,383 B1 | 4/2012 | Everingham et al. | |
| 8,185,591 B1 | 5/2012 | Lewis | |
| 8,208,006 B2 | 6/2012 | Martin-Cocher et al. | |
| 8,312,388 B2 | 11/2012 | Yoshihama et al. | |
| 8,411,758 B2 | 4/2013 | Folgner et al. | |
| 8,417,599 B2 | 4/2013 | Wirth, Jr. | |
| 8,570,335 B2 | 10/2013 | Huang et al. | |
| 8,605,348 B2 | 12/2013 | Bosma | |
| 8,698,762 B2 | 4/2014 | Wagner et al. | |
| 8,856,141 B1 | 10/2014 | Dean et al. | |
| 8,893,026 B2 | 11/2014 | Lindemann et al. | |
| 8,898,208 B2 | 11/2014 | Wu et al. | |
| 8,903,909 B1 | 12/2014 | Marra et al. | |
| 8,923,551 B1 | 12/2014 | Grosz et al. | |
| 9,141,709 B1 | 9/2015 | Keslin et al. | |
| 9,405,500 B1 | 8/2016 | Cox | |
| 9,462,054 B2 | 10/2016 | Poletto et al. | |
| 9,773,228 B2 | 9/2017 | Baldwin et al. | |
| 9,787,799 B2 | 10/2017 | Grue et al. | |
| 9,870,802 B2 | 1/2018 | Carson et al. | |
| 9,967,514 B2 | 5/2018 | Thompson et al. | |
| 10,051,142 B1 | 8/2018 | Villena et al. | |
| 10,491,963 B1 | 11/2019 | Waggoner | |
| 2002/0051065 A1 | 5/2002 | Takahashi et al. | |
| 2002/0054115 A1 | 5/2002 | Mack et al. | |
| 2002/0138630 A1 | 9/2002 | Solomon et al. | |
| 2002/0172421 A1 | 11/2002 | Kondo et al. | |
| 2003/0020749 A1 | 1/2003 | Abu-Hakima et al. | |
| 2003/0076322 A1 | 4/2003 | Ouzts et al. | |
| 2003/0218682 A1 | 11/2003 | Lim et al. | |
| 2004/0003117 A1 | 1/2004 | McCoy et al. | |
| 2004/0024643 A1 | 2/2004 | Pollock et al. | |
| 2004/0109063 A1 | 6/2004 | Kusaka et al. | |
| 2004/0133924 A1 | 7/2004 | Wilkins et al. | |
| 2004/0175764 A1 | 9/2004 | Nishiyama et al. | |
| 2005/0052685 A1 | 3/2005 | Herf et al. | |
| 2005/0097445 A1 | 5/2005 | Day et al. | |
| 2005/0177796 A1 | 8/2005 | Takahashi et al. | |
| 2006/0037053 A1 | 2/2006 | McDowell et al. | |
| 2006/0055944 A1 | 3/2006 | Minakuti et al. | |
| 2006/0109343 A1 | 5/2006 | Watanabe et al. | |
| 2006/0114820 A1 | 6/2006 | Hunt et al. | |
| 2006/0152600 A1 | 7/2006 | Hamada et al. | |
| 2006/0159367 A1* | 7/2006 | Zeineh ................. G02B 21/365 |
| | | | 382/128 |
| 2006/0173974 A1 | 8/2006 | Tang et al. | |
| 2006/0176305 A1 | 8/2006 | Arcas et al. | |
| 2006/0193012 A1 | 8/2006 | Wilkins et al. | |
| 2006/0242163 A1 | 10/2006 | Miller et al. | |
| 2006/0282788 A1 | 12/2006 | Paalasmaa et al. | |
| 2007/0022174 A1 | 1/2007 | Issa et al. | |
| 2007/0047650 A1 | 3/2007 | Vilei et al. | |
| 2007/0133042 A1 | 6/2007 | Park et al. | |
| 2007/0156434 A1 | 7/2007 | Martin et al. | |
| 2007/0226255 A1 | 9/2007 | Anderson et al. | |
| 2007/0253628 A1 | 11/2007 | Brett et al. | |
| 2007/0274563 A1 | 11/2007 | Jung et al. | |
| 2007/0277202 A1 | 11/2007 | Lin et al. | |
| 2007/0294333 A1 | 12/2007 | Yang et al. | |
| 2008/0005669 A1 | 1/2008 | Eilertsen et al. | |
| 2008/0025642 A1 | 1/2008 | Kim | |
| 2008/0052945 A1 | 3/2008 | Matas et al. | |
| 2008/0189625 A1 | 8/2008 | Zuta et al. | |
| 2008/0267494 A1 | 10/2008 | Cohen et al. | |
| 2008/0320222 A1 | 12/2008 | Dhodapkar | |
| 2009/0006978 A1 | 1/2009 | Swift et al. | |
| 2009/0049408 A1 | 2/2009 | Naaman et al. | |
| 2009/0070675 A1 | 3/2009 | Li et al. | |
| 2009/0089448 A1 | 4/2009 | Sze et al. | |
| 2009/0168795 A1* | 7/2009 | Segel ................. H04L 67/1076 |
| | | | 370/429 |
| 2009/0183060 A1 | 7/2009 | Heller et al. | |
| 2009/0187857 A1 | 7/2009 | Tanaka et al. | |
| 2009/0198744 A1 | 8/2009 | Nakamura | |
| 2009/0284611 A1 | 11/2009 | Wood et al. | |
| 2010/0037137 A1 | 2/2010 | Satou | |
| 2010/0082818 A1 | 4/2010 | Paul et al. | |
| 2010/0100455 A1 | 4/2010 | Song | |
| 2010/0150407 A1 | 6/2010 | Cheswick | |
| 2010/0185987 A1 | 7/2010 | Yang et al. | |
| 2010/0269070 A1 | 10/2010 | Kim | |
| 2011/0010629 A1 | 1/2011 | Castro et al. | |
| 2011/0087842 A1* | 4/2011 | Lu ...................... G06F 16/9574 |
| | | | 709/217 |
| 2011/0125755 A1 | 5/2011 | Kaila et al. | |
| 2011/0128150 A1 | 6/2011 | Kanga et al. | |
| 2011/0142335 A1 | 6/2011 | Ghanem et al. | |
| 2011/0157609 A1 | 6/2011 | Brady et al. | |
| 2011/0183278 A1 | 7/2011 | Belasse et al. | |
| 2011/0197123 A1 | 8/2011 | Caine et al. | |
| 2011/0200270 A1 | 8/2011 | Kameyama | |
| 2011/0206342 A1 | 8/2011 | Thompson et al. | |
| 2011/0264768 A1 | 10/2011 | Walker et al. | |
| 2011/0269437 A1 | 11/2011 | Marusi et al. | |
| 2011/0302482 A1 | 12/2011 | Warnock et al. | |
| 2012/0001935 A1 | 1/2012 | Cok et al. | |
| 2012/0005058 A1 | 1/2012 | Buck | |

(56) References Cited

U.S. PATENT DOCUMENTS

| | | |
|---|---|---|
| 2012/0011568 A1 | 1/2012 | Tahan et al. |
| 2012/0102431 A1 | 4/2012 | Krolczyk et al. |
| 2012/0124517 A1 | 5/2012 | Landry et al. |
| 2012/0151383 A1 | 6/2012 | Kazan et al. |
| 2012/0158713 A1 | 6/2012 | Jin et al. |
| 2012/0166478 A1 | 6/2012 | Das et al. |
| 2012/0209815 A1 | 8/2012 | Carson et al. |
| 2012/0210217 A1 | 8/2012 | Abbas et al. |
| 2012/0290916 A1 | 11/2012 | Parekh et al. |
| 2012/0323868 A1 | 12/2012 | Robbin et al. |
| 2012/0324397 A1 | 12/2012 | Patz et al. |
| 2012/0331371 A1 | 12/2012 | Larson et al. |
| 2013/0047084 A1 | 2/2013 | Sanders et al. |
| 2013/0064439 A1 | 3/2013 | Khurd et al. |
| 2013/0080974 A1 | 3/2013 | Suzuki et al. |
| 2013/0111368 A1 | 5/2013 | Laughlin |
| 2013/0159936 A1 | 6/2013 | Yamaguchi et al. |
| 2013/0187946 A1 | 7/2013 | Pan et al. |
| 2013/0204961 A1 | 8/2013 | Fliam et al. |
| 2013/0212067 A1 | 8/2013 | Piasecki et al. |
| 2013/0239003 A1 | 9/2013 | Usenko et al. |
| 2013/0290862 A1 | 10/2013 | Chand et al. |
| 2013/0325463 A1 | 12/2013 | Greenspan et al. |
| 2013/0332856 A1 | 12/2013 | Sanders et al. |
| 2014/0040811 A1 | 2/2014 | Brahmanapalli et al. |
| 2014/0053206 A1 | 2/2014 | Shoykher et al. |
| 2014/0068689 A1 | 3/2014 | Sirpal et al. |
| 2014/0074759 A1 | 3/2014 | Lewis et al. |
| 2014/0111516 A1 | 4/2014 | Hall et al. |
| 2014/0122505 A1 | 5/2014 | Kudo |
| 2014/0140400 A1 | 5/2014 | George et al. |
| 2014/0169684 A1 | 6/2014 | Samii et al. |
| 2014/0189487 A1 | 7/2014 | Kwan et al. |
| 2014/0189539 A1 | 7/2014 | St. Clair et al. |
| 2014/0201796 A1* | 7/2014 | Moon ............... H04N 21/462 725/110 |
| 2014/0209326 A1 | 7/2014 | Delange et al. |
| 2014/0236720 A1 | 8/2014 | Shunock et al. |
| 2014/0282099 A1 | 9/2014 | Bronder et al. |
| 2014/0359482 A1 | 12/2014 | Sinn et al. |
| 2014/0365501 A1 | 12/2014 | Ueno et al. |
| 2015/0032692 A1* | 1/2015 | Litzenberger ......... G06F 16/178 707/620 |
| 2015/0039601 A1 | 2/2015 | Harrang et al. |
| 2015/0070582 A1 | 3/2015 | Jung et al. |
| 2015/0117786 A1 | 4/2015 | James et al. |
| 2015/0145889 A1 | 5/2015 | Hanai et al. |
| 2015/0154167 A1 | 6/2015 | Arhin et al. |
| 2015/0178265 A1 | 6/2015 | Anderson et al. |
| 2015/0185965 A1 | 7/2015 | Belliveau et al. |
| 2015/0193347 A1* | 7/2015 | Kluesing ............. G06F 12/0888 711/137 |
| 2015/0195371 A1 | 7/2015 | Nowakowski et al. |
| 2015/0201001 A1 | 7/2015 | Cabanillas et al. |
| 2015/0234885 A1 | 8/2015 | Weinstein et al. |
| 2015/0244794 A1 | 8/2015 | Poletto et al. |
| 2015/0244833 A1 | 8/2015 | Grue et al. |
| 2015/0254692 A1 | 9/2015 | Xu et al. |
| 2015/0256639 A1 | 9/2015 | Chow et al. |
| 2015/0317380 A1 | 11/2015 | Rathnavelu et al. |
| 2016/0041907 A1 | 2/2016 | Jung et al. |
| 2016/0334967 A1 | 11/2016 | Rottler et al. |
| 2017/0026909 A1* | 1/2017 | Gao ................... G01S 5/02525 |
| 2017/0032373 A1* | 2/2017 | Adams ................ G06Q 20/405 |
| 2017/0123982 A1 | 5/2017 | Haven et al. |
| 2017/0139824 A1 | 5/2017 | Dragoljevic et al. |
| 2017/0324807 A1 | 11/2017 | Gu et al. |
| 2017/0366644 A1 | 12/2017 | Grue et al. |
| 2018/0007323 A1 | 1/2018 | Botusescu et al. |
| 2018/0032259 A1 | 2/2018 | Yook et al. |
| 2018/0364999 A1 | 12/2018 | Li |
| 2019/0005048 A1 | 1/2019 | Crivello et al. |
| 2020/0293548 A1* | 9/2020 | Koorapati .......... H04L 67/1023 |

FOREIGN PATENT DOCUMENTS

| | | |
|---|---|---|
| JP | 2009531873 A | 9/2009 |
| JP | 2012008643 A | 1/2012 |
| JP | 2012069009 A | 4/2012 |
| WO | WO-0169585 A1 | 9/2001 |
| WO | WO-02082799 A2 | 10/2002 |
| WO | WO-2013177769 A1 | 12/2013 |

OTHER PUBLICATIONS

Brivio P., et al., "PileBars: Scalable Dynamic Thumbnail Bars," The 13rd International Symposium on Virtual Reality, Archaeology and Cultural Heritage VAST, 2012, 8 pages.

Communication under rule 71(3) EPC Intention to Grant for European Application No. 14827975.5 dated May 18, 2020, 7 pages.

Communication under Rule 71 (3) EPC of intention to grant for European Application No. 14827975.5 dated Apr. 23, 2020, 7 pages.

European Summons to Attend Oral Proceedings Pursuant to Rule 115(1) EPC for EP Application No. 14827975.5 dated Oct. 28, 2019, 8 pages.

Examination Report for Australian Application No. 2017232144 dated Sep. 14, 2018, 7 pages.

Examination Report for EP Application No. 14827975.5 dated Feb. 20, 2019, 20 pages.

Final Office Action from U.S. Appl. No. 14/247,468, dated Jan. 13, 2020, 25 pages.

International Search Report and Written Opinion for PCT Application No. PCT/US14/72005 dated Mar. 31, 2015, 14 pages.

Jiang Z., et al., "Web Prefetching in a Mobile Environment," IEEE Personal Communications, IEEE Communications Society, vol. 5 (5), Oct. 1, 1998, pp. 25-34.

Lin C., et al., "Fast Browsing of Large-scale Images Using Server Prefetching and Client Caching Techniques," Located Via SPIE http://proceedings.spiedigitallibrary.org/proceeding.aspx?articleid=905231, Jul. 18, 1999, 12 pages.

Ma W.Y., et al., "Framework for Adaptive Content Delivery in Heterogeneous Network Environments," Proceedings of SPIE, SPIE—International Society for Optical Engineering, vol. 3969, DOI:10.1117/12.373537, ISSN 0277-786X, ISBN 978-1-62841-213-0, XP002374871, Jan. 24, 2000, pp. 86-100.

Moshfeghi M., et al., "Efficient image browsing with JPEG2000 internet protocol," located via SPIE—http://proceedings.spiedigitallibrary.org/proceeding.aspx?articleid=841364, Apr. 19, 2004, 12 pages.

Non-Final Office Action from U.S. Appl. No. 14/247,468, dated Jun. 15, 2020, 26 pages.

Non-Final Office Action from U.S. Appl. No. 16/193,157, dated Jun. 25, 2020, 28 pages.

Non-Final Office Action from U.S. Appl. No. 16/227,849, dated Mar. 2, 2021, 21 pages.

Non-Final Office Action from U.S. Appl. No. 16/802,099, dated Dec. 23, 2020, 7 pages.

Notice of Allowance from U.S. Appl. No. 14/247,468, dated Oct. 21, 2020, 10 pages.

Notice of Allowance from U.S. Appl. No. 15/690,126, dated Oct. 21, 2019, 5 pages.

Notice of Allowance from U.S. Appl. No. 16/193,157, dated Jan. 27, 2021, 6 pages.

Notice of Allowance from U.S. Appl. No. 16/227,849, dated Jun. 11, 2021, 8 pages.

Notice of Allowance from U.S. Appl. No. 16/802,099, dated Mar. 11, 2021, 7 pages.

Notice of Allowance for U.S. Appl. No. 14/247,436 dated May 25, 2017, 5 pages.

Notice of Allowance for U.S. Appl. No. 14/927,241 dated Oct. 29, 2018, 11 pages.

Notice of Allowance from U.S. Appl. No. 15/690,126, dated May 24, 2019, 8 pages.

Notice of Allowance from U.S. Appl. No. 15/690,126, dated Feb. 6, 2020, 2 pages.

(56) References Cited

OTHER PUBLICATIONS

Notice of Decision to Grant of Japanese Application No. 2018-191152 dated Mar. 9, 2020, 6 pages.
Notice of Reasons for Refusal of Japanese Application No. 2018-191152 dated Nov. 11, 2019, 9 pages.
Office Action for U.S. Appl. No. 14/247,436 dated Mar. 31, 2016, 16 pages.
Office Action for U.S. Appl. No. 14/247,436 dated Sep. 30, 2016, 22 pages.
Office Action for U.S. Appl. No. 14/927,241 dated Apr. 6, 2018, 16 pages.
Plant W., et al., "Visualisation and Browsing of Image Databases," Located via SpringerLink—https://link.springer.com/chapter/10.1007%2F978-3-642-19551-8_1, 2011, pp. 3-57.
"The Layered Look: Better Responsive Images Using Multiple Backgrounds," Jun. 26, 2013, Wayback Machine, retrieved from https://web.archive.org/web/20131022160602/http://css-tricks.com/the-layered-look/ on Oct. 27, 2018, 27 pages.
Non-Final Office Action from U.S. Appl. No. 17/138,354, dated Mar. 1, 2022, 26 pages.
Non-Final Office Action from U.S. Appl. No. 17/323,858, dated Mar. 2, 2022, 22 pages.
Final Office Action from U.S. Appl. No. 17/323,858, dated May 11, 2022, 20 pages.
Non-Final Office Action from U.S. Appl. No. 17/138,379, dated Mar. 9, 2022, 16 pages.
Final Office Action from U.S. Appl. No. 17/138,379, dated Aug. 15, 2022, 20 pages.
Final Office Action from U.S. Appl. No. 17/138,379, dated Sep. 12, 2022, 17 pages.
Non-Final Office Action from U.S. Appl. No. 17/138,354, dated Jan. 9, 2023, 24 pages.
Non-Final Office Action from U.S. Appl. No. 17/138,379, dated Dec. 22, 2022, 20 pages.
Notice of Allowance from U.S. Appl. No. 17/323,858, dated Aug. 5, 2022, 7 pages.
Notice of Allowance from U.S. Appl. No. 17/323,858, dated Sep. 28, 2022, 2 pages.
Final Office Action from U.S. Appl. No. 17/138,354, dated Jun. 28, 2023, 30 pages.
Final Office Action from U.S. Appl. No. 17/138,379, dated Jun. 5, 2023, 24 pages.
Non-Final Office Action from U.S. Appl. No. 18/049,232, dated Jun. 21, 2023, 15 pages.

* cited by examiner

PROVIDING A DYNAMIC DIGITAL CONTENT CACHE

CROSS-REFERENCE TO RELATED APPLICATIONS

This application is a continuation of U.S. patent application Ser. No. 16/227,849, filed on Dec. 20, 2018, issued as U.S. Pat. No. 10,198,355, which is a continuation of U.S. patent application Ser. No. 14/927,241, filed on Oct. 29, 2015, which issued as U.S. Pat. No. 10,198,355. Each of the aforementioned applications is hereby incorporated by reference in its entirety.

BACKGROUND

1. Technical Field

One or more embodiments of the present disclosure generally relate to providing digital content. More specifically, one or more embodiments disclosed herein relate to systems and methods for creating and maintaining a dynamic cache of digital content items on a client device.

2. Background and Relevant Art

Computing devices (e.g., computers, tablets, smart phones) provide numerous ways for people to capture, create, share, view, and otherwise interact with numerous types of digital content. For example, many computing devices allow users to interact with digital content by capturing, sharing, and experiencing digital images and videos. Overtime, a typical user can collect a large amount of digital content. As the amount of digital content increases, it becomes more difficult for the user to locally store and view each piece of digital content on a computing device. In particular, conventional systems for storing and experiencing digital content have several disadvantages.

For example, many conventional systems only present a portion of a digital content collection to a user on a computing device because the computing device providing the digital content collection to the user has a limited storage capacity and cannot hold the entire digital content collection. As such, because the size of the digital content collection is larger than the allocated space on the computing device that stores the digital content collection, a user cannot navigate to and view every digital content item in a digital content collection because many of the digital content items are missing.

In addition, in many conventional systems, as a user adds digital content items to his or her digital content collection, the size of the digital content collection grows. On a computing device, as the size of the digital content collection grows, the capacity to store other items on the computing device decreases. Many conventional systems will continue to add digital content items and occupy available storage space on the computing device until the storage space is full. As a result, the computing device does not have room to store other external data, such as applications and application data that is separate from the digital content collection.

Furthermore, when the storage space on a computing device is full, conventional systems do not allow a user to add additional digital content items to the digital content collection until the user manually removes digital content items from the digital content collection or removes other stored data from the computing device. Having to constantly remove, and possibly lose, older digital content items in the digital content collection before being able to add additional digital content items to a digital content collection can be time consuming, inefficient, and frustrating for a user.

Additionally, when adding digital content items to a digital content collection, a user must often wait for the digital content items to be identified, downloaded, and organized on a computing device. In some instances, conventional systems do not begin the process of obtaining and adding digital content items to a digital content collection on a computing device until a user manually initiates the process. Further, after manually initiating the process, the user may wait for each digital content item to be identified, downloaded, and organized before the user is presented with one or more of the additional digital content items. Waiting for conventional systems to present each additional digital content item can also be time consuming and frustrating to a user.

Accordingly, there are a number of considerations to be made in providing and maintaining a digital content collection.

SUMMARY

Embodiments of the present disclosure provide benefits and/or solve one or more of the foregoing or other problems in the art with systems and methods for providing a digital content collection to a user on a client device. For example, one or more embodiments include systems and methods for providing a dynamic thumbnail cache of digital content items (e.g., photos, videos) to a user on a client device. In particular, the systems and methods described herein provide a thumbnail cache of a digital content collection on a client device such that the thumbnail cache does not exceed a threshold storage size set on the client device. In addition, the system and methods described herein dynamically adjust the thumbnails within the thumbnail cache to remain within the threshold storage size irrespective of the number of digital content items stored or added to the digital content collection. Similarly, the system and methods described herein dynamically adjust the thumbnail cache based on the digital content items determined to most likely be of interest to the user. The system and methods described herein also dynamically adjust the size of the thumbnail cache based on changes to the available data on the client device. Further, the system and methods described herein allow new digital content items to be added to the thumbnail cache automatically and without user intervention.

To briefly illustrate, in one or more embodiments, the disclosed system creates multiple thumbnail versions that vary in size, resolution, and/or quality of a digital content item. The system then provides one more thumbnail versions of a digital content item to a client device. For example, the system can provide low-resolution thumbnails of the digital content items for some or all of the digital content items in a digital content collection, and also provide normal or high-resolution thumbnails to the client device for a portion of content items (e.g., the most important or relevant content items) in the digital content collection. The thumbnail version(s) of a digital content item that the system provides to the client device for a digital content item may depend on the classification (e.g., rank or sort order) of the digital content item within the digital content collection.

Additionally, in one or more embodiments, as the size of a digital content collection increases, the disclosed systems and methods can reduce the size of the thumbnail cache on the client device. For example, the disclosed system can use reduced-sized thumbnail versions in place of larger-sized thumbnail versions for select digital content items for lower-ranked digital content items. Thus, the system can add additional digital content items to the digital content collection without increasing the overall size of the thumbnail cache on the client device. Similarly, as available storage space on the client device increases or decreases, the system can dynamically modify the size of the thumbnail cache accordingly, either to maintain a constant size or provide additional space on the client device for other data on the client device apart from the thumbnail cache.

Further, one or more embodiments disclosed herein include systems and methods of downloading digital content items that are added to a remotely-stored digital content collection before a user requests to access the digital content items. In other words, in one or more embodiments, the systems and methods may pre-fetch digital content items, such that at least one version of each added digital content item is presentable to the user. Then, based on the classification of the added digital content item, the systems and methods may provide larger-sized versions of the additional digital content items to the client device.

Additional features and advantages of the present disclosure will be set forth in the description that follows, and in part will be obvious from the description, or may be learned by the practice of such exemplary embodiments. The features and advantages of such embodiments may be realized and obtained by way of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the present disclosure and are not therefore to be considered limiting of its scope, the present disclosure will be described and explained with additional specificity and detail using the accompanying drawings.

DETAILED DESCRIPTION

Figure 1:
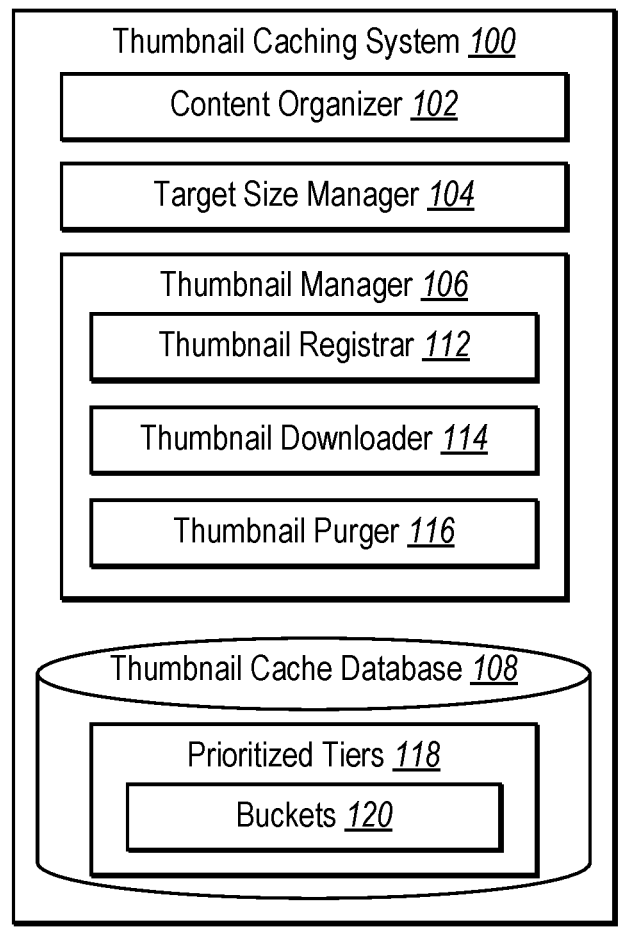
FIG. 1 illustrates a thumbnail caching system in accordance with one or more embodiments.

The present disclosure provides one or more embodiments of a thumbnail caching system that provides a digital content collection to a user on a client device. In particular, the thumbnail caching system dynamically provides a digital thumbnail cache of digital content items (e.g., images, videos, audio) within a remotely-stored digital content collection to a user on a client device while controlling the size of the thumbnail cache on the client device. In addition, the thumbnail caching system identifies, pre-fetches, and downloads new content items to the client device automatically before a user accesses his or her digital content collection on the client device.

As mentioned, the disclosed thumbnail caching system dynamically provides a thumbnail cache of digital content items on client device. In providing the dynamic thumbnail cache on the client device, the thumbnail caching system intelligently adjusts the size of the thumbnail cache to prevent the thumbnail cache from exceeding a specified threshold storage limit or size, while still providing the user with each content item in the user's digital content collection. In this manner, when content items (e.g., thumbnails of the content items) are added to the client device, or when the specified threshold storage limit changes, the thumbnail caching system can dynamically adjust (e.g., add or remove) thumbnails within the thumbnail cache to remain within the threshold storage limit while still providing the user with as many content item in the user's digital content collection as possible.

To briefly illustrate, in one or more embodiments, the thumbnail caching system can identify one or more content items that belong to a user's digital content collection (e.g., by communicating with a remote content management system storing the digital content collection). Upon identifying the content items, the thumbnail caching system can assign thumbnails associated with each content item to one or more buckets. In particular, the thumbnail caching system can identify attributes associated with each thumbnail and assign the thumbnail to one or more buckets based on the attributes. In addition, the thumbnail caching system can assign each bucket to a prioritized tier. In many instances, the thumbnail caching system may assign multiple buckets to the same prioritized tier. Further, the thumbnail caching system can assign proportional ratios to each bucket in a prioritized tier.

Once thumbnails of the identified content items are assigned to one or more buckets within the prioritized tiers, the thumbnail caching system can begin downloading the thumbnails to a client device. In particular, starting with buckets in the higher prioritized tier, the thumbnail caching can begin downloading the thumbnails in proportional batches according to the proportion ratios assigned to the buckets in the tier. The thumbnail caching system can continue to download proportional batches until every thumbnail in the tier is downloaded or until the thumbnail cache reaches a storage threshold limit (e.g., storage size or proportion limit).

If the thumbnail caching system downloads each thumbnail in a prioritized tier, the thumbnail caching system can begin downloading, in a similar manner, thumbnails in the next-highest prioritized tier. Again, the thumbnail caching system can download thumbnails in proportional batches until each thumbnail in the tier is downloaded or until the thumbnail cache reaches the storage threshold limit. The thumbnail caching system can continue downloading thumbnails to the thumbnail cache on the client device in accordance with the prioritization of tiers (e.g., from the higher prioritized tier to the lowest prioritized tier) until all the thumbnails associated with content items in the digital content collection are downloaded or until the storage threshold limit is met.

In some embodiments, after the thumbnail caching system has created a thumbnail cache on a client device of a user, the thumbnail caching system may identify additional content items to add to the client device. In particular, in one or more embodiments, the thumbnail caching system identifies thumbnails associated with the additional content items that are to be added to the thumbnail cache on the client device. In these embodiments, the thumbnail caching system again sorts the additional thumbnails into the buckets and prioritized tiers. Depending on the rank or sort order of the additional thumbnail in comparison to other thumbnails in a bucket, the thumbnail caching system can determine whether to download the additional thumbnail to the client device. In some cases, the determination as to whether to download a particular thumbnail is based on whether the storage threshold limit has been met.

In various embodiments, the thumbnail caching system determines that the thumbnail cache has exceeded the storage threshold limit and that thumbnails in the thumbnail cache need to be purged until the storage threshold limit is no longer exceeded. Likewise, in some embodiments, the thumbnail caching system determines that thumbnails in the thumbnail caching system must be purged before additional, higher-ranked thumbnails can be added to the client device. In these embodiments, the thumbnail caching system uses the prioritized tiers, bucket proportion ratios, and the sort order of thumbnails within a bucket to determine which thumbnails to remove, as described below in additional detail. In this manner, the thumbnail caching system can maintain the size of the thumbnail cache of a client device when adding additional content items to the client device.

Accordingly, the thumbnail caching system can provide a number of advantages over conventional systems. As mentioned above, the thumbnail caching system can provide a user with his or her digital content collection on a client device while dynamically adjusting the size of the thumbnail cache on the client device based on the user's needs and preferences. Thus, if the user has limited space on his or her client device, either due to the user having a low storage capacity device or storing larger amounts of other data on the client device, the thumbnail caching system can dynamically reduce the size of the thumbnail cache on the client device. In some embodiments, when a user frees up additional storage space on the client device, the thumbnail caching system can intelligently expand the size of the thumbnail cache on the client device to provide the user with an enhanced viewing experience of the user's digital content collection. In other embodiments, when a user decreases the size allowed to the thumbnail cache, the thumbnail caching system can intelligently and dynamically reduce the size of the thumbnail cache accordingly while still maintaining each content item in the user's digital content collection on the client device.

As used herein, the term "digital content" refers to any digital data. For example, digital content can include a defined portion of digital data (e.g., a data file). Examples of digital content include, but are not limited to, digital images, digital video files, digital audio files, electronic document files of all types, streaming content, contact lists, and/or folders that include one or more digital content items. Digital content can comprise one or more digital content items.

The terms "digital content item" (or simply "content item") may refer to pieces of digital content. Further, the term content item can refer to the digital content items themselves or portions thereof. For example, the term digital content item may refer to a digital image (e.g., a full resolution image) or thumbnail images representing the image. Likewise, a digital content item may be a frame of a video or the entire video. In other words, digital content items can include representations, such as reduced-sized versions of digital content items (e.g., thumbnail images, low-quality audio files, compressed video files, etc.). In some instances used throughout this disclosure, the terms "digital content item" and "thumbnail" may be used interchangeably. For example, and with respect to digital images, the terms "thumbnails" and "thumbnail images" refer to versions of a digital image having varying resolutions and/or sizes. The term "thumbnail" and "thumbnail image" can also refer to a full resolution/size digital image. Additionally or alternatively, the terms "thumbnails" and "thumbnail images" refer to a digital image—typically a low-resolution image—that represents a digital content item.

Additionally, as used herein, a "digital content collection" (or simply "collection") refers to any defined group of digital content items. A collection can include a single type of digital content item or multiple different types of digital content items. A collection can include as few as one content item, but in many instances, a collection can include a large number of content items. For example, a collection of digital content items can include a plurality of images and/or videos. Although the present disclosure provides specific examples related to digital image collections (e.g., photos and videos), one will appreciate that the principles described herein may be applied to other types of collections of digital content, such as music collections, document collections, and/or any other type of digital content collection.

In one or more embodiments, the system can provide a collection of digital content items via a graphical user interface. As used herein, a gallery of digital content items, or simply "gallery," refers to a presentation of a collection, or a portion of a collection, of digital content items within a graphical user interface. Examples of galleries include, but are not limited to, an events gallery, an albums gallery, a shared content items gallery, a conversations gallery, a hidden content items gallery, recently-used content items gallery, a recently-viewed content items gallery, a historic content items gallery, and a flashback gallery. Further, a gallery of digital content items can allow a user to browse a collection of digital content by navigating within the gallery (e.g., scrolling the gallery of digital content items through a view area of the graphical user interface). A gallery can have various formats depending, for instance, on the type of digital content items included in a collection. For example, a gallery can have a grid of images in a collection of digital images. Alternatively, a gallery of document files can be formatted into a list of file names.

Additionally, as used herein the term "storage threshold limit" refers to an allocated size or percentage of storage on a client device. In some embodiments, the storage threshold limit is based on a specified amount of storage space allocated to the thumbnail cache on a client device (e.g., 3 gigabytes or 15% of the client device's memory capacity). In some embodiments, a user can adjust the storage threshold limit according to user preference. In additional or alternative embodiments, the storage threshold limit is based on the amount of available storage space on the client device. For instance, the storage threshold limit can be set such that the client device has at least 1 gigabytes (or 10%) of free storage space on the client device. In these embodiments, as the user adds and removes other data to the client device, the amount of space available within the storage threshold limit can change accordingly.

Additional features and characteristics of one or more embodiments of a thumbnail caching system are described below with respect to the Figures. FIG. 1 illustrates an example embodiment of thumbnail caching system 100. As shown, thumbnail caching system 100 may include, but is not limited to, content organizer 102, target size manager 104, thumbnail manager 106, and thumbnail cache database 108. As shown, content organizer 102 includes content assigner 110 and thumbnail manager 106 includes thumbnail registrar 112, thumbnail downloader 114, and thumbnail purger 116. Thumbnail cache database 108 includes tiers 118, which include buckets 120.

Each of components 102-120 of thumbnail caching system 100 may be in communication with one another using any suitable communication technologies. In addition, although components of thumbnail caching system 100 are shown separately in FIG. 1, any of components of thumbnail caching system 100 may be combined into fewer components, such as into a single component, or divided into more components as may serve a particular embodiment. In addition, components of thumbnail caching system 100 may be located on, or implemented by, one or more computing devices, such as one or more client devices and/or one or more server devices.

Each of components of thumbnail caching system 100 can comprise software, hardware, or both. For example, each of components of thumbnail caching system 100 can comprise one or more instructions stored on a computer-readable storage medium and one or more processors of one or more computing devices to execute instructions. When executed by the one or more processors, the computer-executable instructions cause a computing device to perform the methods described herein. Alternatively, components of thumbnail caching system 100 can comprise hardware, such as a special purpose processing device to perform a certain function or group of functions.

As an overview, in one or more embodiments, thumbnail caching system 100 identifies content items and their thumbnails corresponding to a user's digital content collection, including newly added or shared content items. Thumbnail caching system 100 can enable a client device to download and store the identified thumbnails until the thumbnail cache on the client device meets or exceeds a storage threshold limit. Further, thumbnail caching system 100 can purge thumbnails when the size of the thumbnail cache exceeds the storage threshold limit on the client device.

In downloading thumbnails to the client device, thumbnail caching system 100 can specify the order (e.g., a sort order based on reverse chronology), in which thumbnails are to be downloaded to the client device. In particular, the thumbnail caching system 100 can employ buckets 120 within prioritized tiers 118 to prioritize the download of the thumbnails. Then, thumbnail caching system 100 downloads thumbnails according to a sort order of the thumbnails in each of buckets 118 of prioritized tiers 118, beginning at a highest prioritized tier and continuing to lower prioritized tiers, until the size of the thumbnail cache reaches the storage threshold limit or until all the thumbnails are downloaded to the thumbnail cache on the client device.

As mentioned above, and as shown in FIG. 1, thumbnail caching system 100 includes content organizer 102. Content organizer 102 can identify, organize, and otherwise manage content items that belong to a digital content collection associated with a user. For example, content organizer 102 identifies a content item captured by a client device or shared with a user and organizes the identified content item within a digital content collection associated with the user.

In addition, content organizer 102 can assign content items to one or more galleries. For example, content organizer 102 can assign each content item to one or more galleries. Specifically, content organizer 102 assigns a content item to one or more galleries by identifying an "interest" or "gallery interest" of the one or more galleries in the content item. In other words, based on the configuration of each gallery, content organizer 102 determines whether the content item belongs to the gallery (i.e., whether the gallery has an "interest" in the content item). To illustrate, content organizer 102 can assign a content item to an "events gallery" based on a determination that the content item corresponds to an event represented in the events gallery. Similarly, content organizer 102 can assign a content item to a "shared gallery" based on a determination that the content items has been shared by or with the user. In one or more embodiments, assignments to galleries is based on metadata associated with content items. Additionally or alternatively, content organizer 102 can update metadata associated with a digital content item to reflect corresponding assignments to galleries (i.e., gallery interests).

In some embodiments, when content organizer 102 assigns a content item to a gallery, the identified gallery interest carries over to thumbnails of the content item. For example, when content organizer 102 assigns a content item to a shared gallery, high-resolution, medium-resolution, and lower-resolution thumbnails of the content item inherit the assignment to the shared gallery. Thus, if content organizer 102 identifies multiple gallery interests for a content item, thumbnails of the content item also receive the multiple gallery interests.

In addition, content organizer 102 assigns thumbnails of content items to buckets 120 within prioritized tiers 218. Generally, content organizer 102 identifies attributes of a thumbnail and assigns the thumbnail to a bucket based on the attributes. More specifically, in one or more embodiments, content organizer 102 identifies a pair of attributes of a content item including a gallery interest attribute and thumbnail quality attribute. Based on the identified attributes, content organizer 102 assigns the thumbnail to a bucket that is associated with a unique pairing of attributes (e.g., a unique pairing of a gallery interest attribute and a thumbnail quality attribute) matched by the attributes of the thumbnail. In some examples, content organizer 102 assigns the same thumbnail to multiple buckets having pairings of attributes matching the attributes of the thumbnail. Additional examples of assigning thumbnails to buckets are given in connection with FIGS. 4A-4C.

As FIG. 1 illustrates, the thumbnail caching system 100 also includes a target size manager 104. Because the storage capacity of client devices is often limited, many client devices do not have sufficient storage space to locally store every thumbnail from a user's digital content collection. As such, target size manager 104 monitors the space the thumbnail caching system 100 uses on a client device.

More specifically, target size manager 104 detects when thumbnail caching data approaches and/or exceeds the storage threshold limit on a client device based on changes in the amount of thumbnail cache data stored and/or changes in the amount of storage available. For example, target size manager 104 can detect that the storage threshold limit is exceeded based on a reduction of storage available on a client device and/or an increase in the amount of thumbnail caching data stored on the client device. Further, target size manager 104 can detect when the storage threshold limit is no longer exceeded based on an increase in the amount of storage available on the client device and/or a decrease in the amount of thumbnail caching data stored on the client device.

In some embodiments, target size manager 104 can communicate with other components of thumbnail caching system 100, such as thumbnail manager 106. For example, when the storage threshold limit is approaching the storage threshold limit, target size manager 104 can notify thumbnail manager 106, as described further below. Likewise, target size manager 104 can notify thumbnail manager 106 when the storage threshold limit is exceeded. Further, target size manager 104 can notify thumbnail manager 106 when the storage threshold limit no longer exceeds the storage threshold limit.

Thumbnail manager 106 manages thumbnails on a client device. In particular, thumbnail manager 106 determines when to download and/or purge thumbnails based on, for example, whether a thumbnail cache exceeds a storage threshold limit. Further, thumbnail manager 106 selectively downloads thumbnails based on assignments (e.g., by content organizer 102) of the thumbnails to buckets 120 within prioritized tiers 118. As shown in FIG. 1, thumbnail manager 106 includes thumbnail registrar 112, thumbnail downloader 114, and thumbnail purger 116.

In one or more embodiments, thumbnail registrar 112 registers thumbnails for download to one or more buckets 120. Initially, thumbnail registrar 112 can use the bucket assignments (e.g., from content organizer 102) to identify the thumbnails assigned to each bucket. In addition, thumbnail registrar 112 can sort or rank the thumbnails assigned to each bucket based on a sort order. The sort order can be based on reverse-creation date chronology, last-used dates, and/or last-viewed dates. Based on available storage space, thumbnail registrar 112 may register which thumbnails assigned to a bucket should be downloaded. Accordingly, thumbnail registrar 112 may indicate to the thumbnail downloader 114 which thumbnails to download. As such, not every thumbnail assigned to a bucket is necessarily downloaded to a thumbnail cache of the client device, but only the thumbnails assigned to a bucket and registered to be downloaded to the bucket.

In general, thumbnail registrar 112 starts with the highest prioritized tier when registering which thumbnails should be downloaded by thumbnail downloader 114. When the thumbnails in the buckets of the highest prioritized tier are registered, thumbnail registrar 112 registers thumbnails in buckets of the next highest prioritized tiers. Thumbnail registrar 112 continues registering thumbnails in buckets of each tier in accordance with the prioritization of the prioritized tiers.

When multiple buckets belong to a prioritized tier, thumbnail registrar 112 may distribute the registration of thumbnails to download across the multiple buckets. In this manner, if a storage threshold limit is reached in the middle of the prioritization tier, the registration of thumbnails is evenly distributed across the buckets. Additionally or alternatively, thumbnail registrar 112 can use proportion ratios assigned to the buckets in each prioritized tier to determine how many thumbnails to register in each bucket for download, as described in more detail below.

In addition to registering thumbnails to download within buckets, thumbnail registrar 112 can unregister thumbnails. For example, thumbnail registrar 112 can unregister the lowest-ranked (e.g., based on a sort order) registered thumbnails belonging to buckets in the lowest prioritized tier including thumbnails registered for download. In one or more embodiments, thumbnail registrar 112 unregisters thumbnails when a storage threshold limit is exceeded and some thumbnails need to be purged (i.e., deleted). Further, thumbnail registrar 112 can continue to unregister thumbnails until the storage threshold limit is no longer exceeded.

In additional or alternative embodiments, thumbnail registrar 112 can unregister thumbnails based on a fullness score of a bucket. Specifically, thumbnail registrar 112 can compare the fullness score of buckets within the same prioritized tier and unregister thumbnails in buckets having the highest fullness score. As thumbnail registrar 112 unregisters thumbnails in a bucket, the fullness score for the bucket lowers, potentially causing another bucket in the prioritized tier to have the high fullness score in the prioritized tier. Thumbnail registrar 112 can then switch to the bucket now having the highest fullness score and begin to unregister thumbnails until again the fullness score of another bucket exceeds the fullness score of the current bucket. Accordingly, thumbnail registrar 112 distributes the unregistration of thumbnails across buckets, as will be explained in more detail below in connection with FIGS. 4A-4C.

As mentioned, thumbnail manager 106 includes thumbnail downloader 114. In one or more embodiments, thumbnail downloader 114 downloads thumbnails and other thumbnail caching data to a client device. In general, thumbnail downloader 114 downloads thumbnails registered for download by thumbnail registrar 112. In one or more embodiments, thumbnail downloader 114 downloads thumbnails in batches (e.g., smaller groups of thumbnails rather than downloading all thumbnails at once). For example, thumbnail downloader 114 identifies registered thumbnails for buckets located in the same prioritized tier. In each batch, thumbnail downloader 114 can download at least one registered thumbnail from each bucket in the prioritized tier that has a registered thumbnail still needing to be downloaded. In some cases, and as described additionally below, thumbnail downloader 114 can download batches of thumbnails for buckets in a prioritized tier according to proportion ratios assigned to the buckets. In alternative embodiments, thumbnail downloader 114 can download batches of thumbnails based on payload size (e.g., so that each batch includes less than five megabytes of thumbnail data).

In addition to downloading thumbnails, in some cases thumbnail downloader 114 can identify a thumbnail registered to one bucket that has been previously downloaded. For example, thumbnail downloader 114 can determine if the thumbnail was registered to another bucket in the same prioritized tier or a prioritized tier having a higher priority and was previously downloaded by thumbnail downloader 114. In this case, thumbnail downloader 114 can skip downloading the thumbnail again and create, within the current bucket/tier, a link to the previously-downloaded thumbnail.

Thumbnail manager 106 also includes thumbnail purger 116. Thumbnail purger 116 can delete thumbnails from a client device to free up storage space on the client device. In general, thumbnail purger 116 removes thumbnails and other thumbnail caching data from a client device. Thumbnail purger 116, in one or more embodiments, removes a thumbnail from a client device when the thumbnail is no longer registered for download to any bucket. Thus, if a thumbnail is only registered in a single bucket, when the thumbnail becomes unregistered, thumbnail purger 116 removes the thumbnail from the client device. If, however, a thumbnail is registered to multiple buckets, thumbnail purger 116 waits until the thumbnail is unregistered from each bucket before removing the thumbnail from the client device.

As mentioned, thumbnail caching system 100 includes thumbnail cache database 108. Thumbnail cache database 108 can store thumbnails, for example, in a thumbnail cache. Further, thumbnail cache database 108 can store thumbnails using identifiers that identify or are otherwise associated with the thumbnails. An identifier can be a thumbnail ID (or "Thumb ID") that uniquely identifies the thumbnail relative to other thumbnails. In some instances, the thumbnail ID provides additional information about the thumbnail, such as the size, quality, and/or resolution of the thumbnail (e.g., high-, medium-, or low-resolution). Thumbnail cache database 108 can also store other thumbnail cache data, such as metadata for the thumbnail, user information, graphical user interface information, gallery information, etc.

In addition, thumbnail cache database 108 can store data representative of buckets 120 and corresponding prioritized tiers 118. Each prioritized tier can be associated with a identifier (or "tier ID") used to identify the prioritized tier within the thumbnail cache database 108. Additionally, stored data associated with a prioritized tier can specify its priority or rank in relation to the other prioritized tiers in the prioritized tiers 118. Further, stored data associated with a prioritized tier can specify which buckets 120 are included in the prioritized tier. For example, the stored data can include a listing of bucket identifiers (or "Bucket IDs") for the buckets in a prioritized tier. and the unique pair of attributes associated with each bucket (e.g., gallery interest and thumbnail quality level).

Buckets 120 can include data associated with the buckets belonging to each of prioritized tiers 118. For example, the stored data can include information identifying the prioritized tier to which the bucket belongs. Further, the stored data can specify a unique pair of attributes associated with each bucket. In particular, the stored data can specify a gallery interest and a thumbnail quality corresponding to each bucket. Additionally, for each bucket, the stored data can include a list of thumbnails assigned to the bucket. The list of assigned thumbnails can be arranged according to a sort order (e.g., creation recency) and/or based on a sort key (e.g., creation date/time) associated with each of the thumbnails. Further, the stored data can indicate which thumbnails are registered for download to the bucket. When a registered thumbnail is downloaded to the bucket, the bucket can link the listing of the registered thumbnail in the bucket to where the thumbnail is stored in the thumbnail cache database 108.

The stored data in buckets 120 can also include other information, such as a proportion ratio assigned to the bucket, a number of assigned thumbnails in the bucket, a number of thumbnails registered in the bucket, and/or a fullness score of the bucket.

Figure 2:
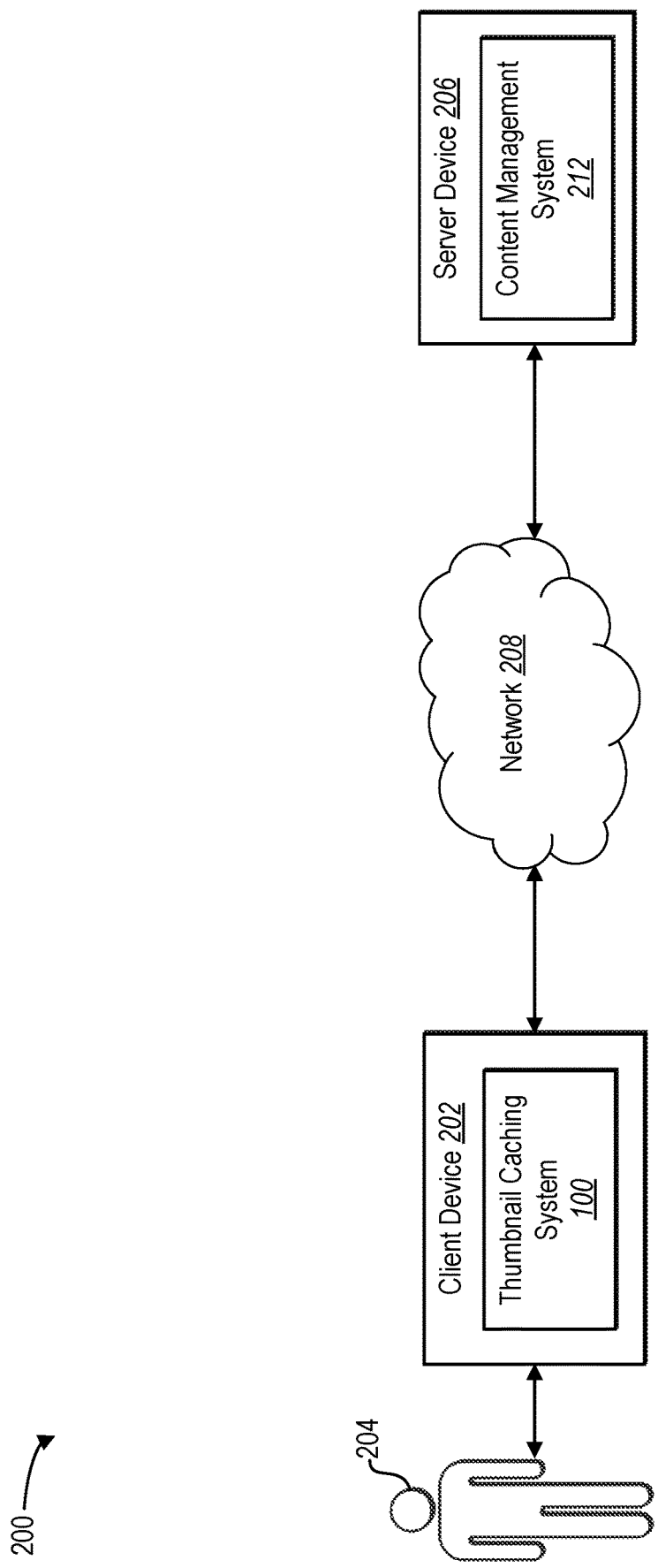
FIG. 2 illustrates a block diagram of an environment for implementing the thumbnail caching system in accordance with one or more embodiments.

FIG. 2 illustrates a block diagram of an example environment 200 for implementing thumbnail caching system 100. In general, and as illustrated in FIG. 2, environment 200 includes a client device 202 that is associated with a user 204. Client device 202 may communicate with a server device 206 via a network 208. Additionally, as shown in FIG. 2, client device 202 includes thumbnail caching system 100 and can perform the functions, features, processes, and systems as described herein with respect to thumbnail caching system 100. Further, as shown in FIG. 2, server device 206 may include a content management system 212.

While FIG. 2 illustrates thumbnail caching system 100 implemented on client device 202, in some embodiments, thumbnail caching system 100 can be additionally or alternatively implemented on server device 206. For example, server device 206 may implement thumbnail caching system 100 and perform the functions, features, processes, and systems as described herein with respect to thumbnail caching system 100. In another example, client device 202 may work in conjunction with server device 206 to perform the various functions, features, processes, and systems as described herein with respect to thumbnail caching system 100. For instance, server device 206 and client device 202 may both performs the functions, features, processes, and systems as described herein with respect to thumbnail caching system 100. In another instance, server device 206 may determine which thumbnails to send and remove from client device 202 while client device 202 maintains a database of thumbnails (e.g., a thumbnail cache) and presents the thumbnails to user 204.

Generally, client device 202 may include any one of various types of client devices. For example, client device 202 can be a mobile device (e.g., smart phone), tablet, laptop computer, desktop computer, or any other type of computing device as further explained below with reference to FIG. 8. Additionally, client device 202, server device 206, and network 208 may communicate using any communication platforms and technologies suitable for transporting data and/or communication signals, including any known communication technologies, devices, media, and protocols supportive of remote data communications, examples of which are also described below with reference to FIG. 9.

In some embodiments, client device 202 can capture, store, receive, or otherwise access multiple digital content items. For example, user 204 can take a photo using client device 202 (e.g., a smart phone). Furthermore, client device 202 can maintain the photo or a copy of the photo within storage on client device 202. Additionally, client device 202 can upload the photo to content management system 112 and receive additional digital content items from content management system 112 and various other sources, such as electronic communications from other users (e.g., email, IM, SMS text), websites, digital content servers (e.g., server device 206), and/or any other source of digital content with which client device 202 may communicate. In addition, client device 202 can organize the obtained digital content items into one or more collections of digital content.

In various embodiments, client device 202 communicates with server device 206 via network 208 to upload one or more digital content items to content management system 112 and/or download one or more digital content items and thumbnails thereof from content management system 112.

content management system 212 In some embodiments, client device 202 and content management system 212 can synchronize digital content items maintained on client device 202 and/or server device 206. For instance, thumbnail caching system 100 can provide one or more newly-captured digital content items to content management system 212 and/or download one or more thumbnails from content management system 212 for digital content items that have been captured by other client devices and/or that are not already stored on client device 202.

Using downloaded thumbnails, client device 202 may present user 204 with his or her collection of digital content items via a graphical user interface on client device 202, For example, client device 202 may present a gallery of thumbnail images stored on client device 202. For instance, client device 202 displays multiple thumbnails in a grid layout via the graphical user interface. In addition, client device 202 may include one or more features that enable user 204 to interact with the digital content collection. For example, user 204 may navigate or scroll through one or more galleries of digital content on client device 204. Further, in some embodiments, user 204 may interact with one or more thumbnails and/or content items provided via the graphical user interface.

In one or more embodiments, content management system 212 maintains a collection of content items in a user's digital content collection. The collection can include information about each content item, such as, but not limited to, the creation date, the size, and the resolution of each content item. The collection can also include metadata of a content item, such as with whom a content item has been shared, a computing device used to capture the content item, settings used to capture the content item, etc.

Content management system 212, in various embodiments, can store multiple thumbnails for each content item in a user's content item collection. For example, content management system 212 can create low-, medium-, and high-resolution thumbnails for a content item. As used herein, "high-resolution" may refer to high-quality images (e.g., thumbnails) of digital content items. Typically, high-resolution thumbnails have larger file sizes, and therefore, increase the amount of storage needed on client device 202. Generally, high-resolution thumbnails include images of 512×512 pixels or larger. In addition, content management system 206 can create lower resolution thumbnail versions of content items, such as a medium-resolution thumbnail (e.g., 150×150 pixels or 256×256 pixels) or a low-resolution thumbnail (e.g., 75×75 pixels). Generally, as used herein, a medium-resolution thumbnail refers to a thumbnail image that has a lower resolution (e.g., 150×150 pixels or 256×256 pixels) than a high-resolution thumbnail, and a low-resolution thumbnail refers to a thumbnail that has a lower resolution (e.g., 75×75 pixels) than a medium-resolution thumbnail. In addition, while sample resolutions are provided above in connection with the resolution levels, one will appreciate that various additional resolution sizes and pixel combinations are possible. In particular, one will appreciate that thumbnail caching system 100 and/or content management system can employ any number of aspect ratios, resolutions levels, and sizes. Also, it should be noted that the term "quality" may be used interchangeable with "resolution" (e.g., medium-quality thumbnail) throughout.

As mentioned, content management system 212 can receive content items, such as high-resolution images, from client device 202. Additionally, and/or alternatively, content management system 212 can receive content items from other sources such as other client devices associated with the user. Upon receiving the content items, content management system 212 can add the received content items to a user's digital content collection maintained by content management system 212, and even create thumbnail versions of each content item. In addition to receiving content items, content management system 212 can provide one or more thumbnails of the content items client device 202 upon the client device. In some cases, for example when a user requests a full-size version of the content item, content management system 212 can provide the content item itself to client device 202.

Figure 3:
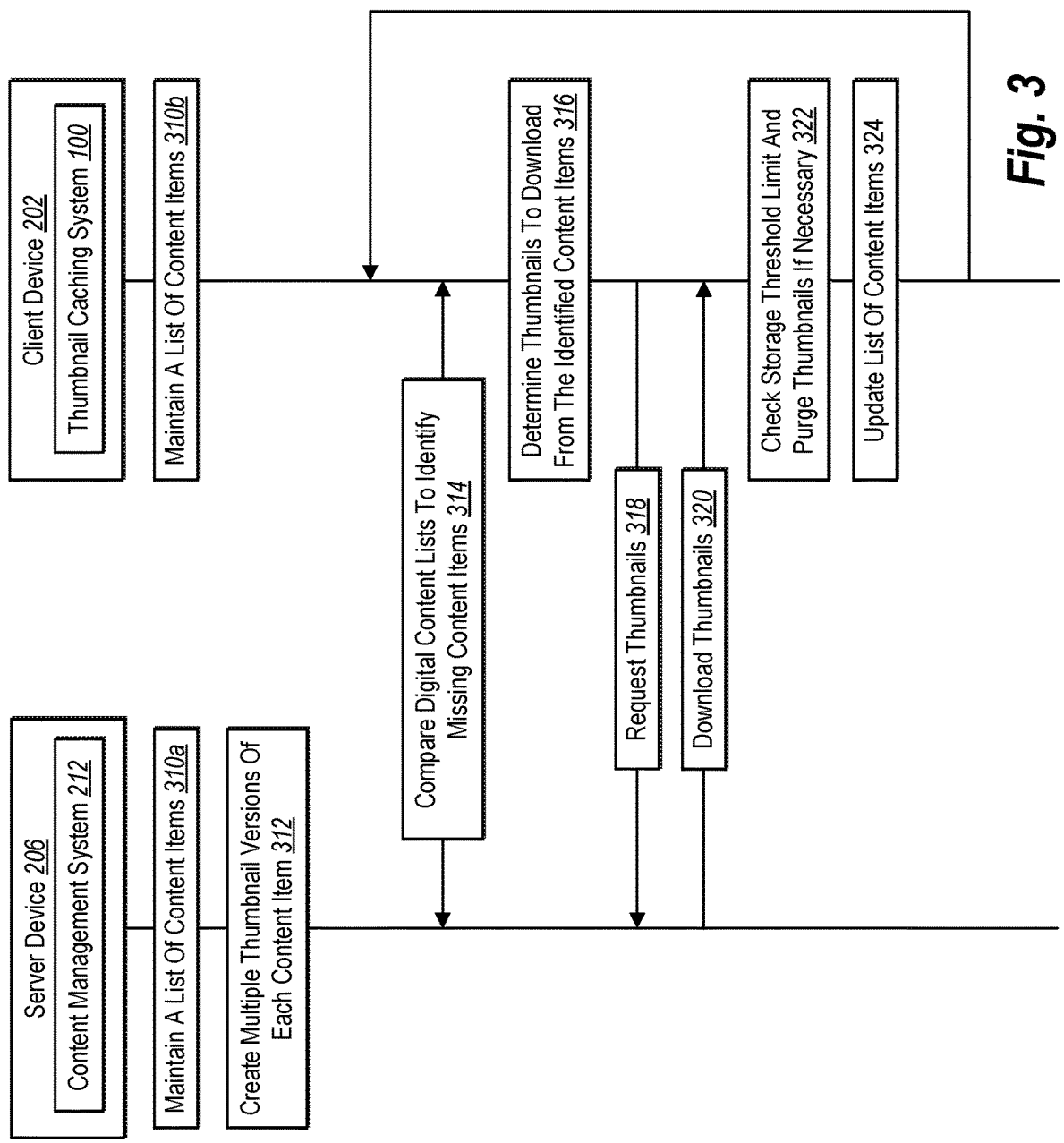
FIG. 3 illustrates a method-flow diagram of a content management system communicating with a client device to create a thumbnail cache on the client device in accordance with one or more embodiments.

FIG. 3 illustrates a diagram of method-flow 300 showing content management system 212 communicating with thumbnail caching system 100 to create a thumbnail cache on client device 202. As shown in step 310a of FIG. 3, content management system 212 maintains a list of content items stored at content management system 212 that correspond to a user. For example, the list may include each content item that a user has in his or her digital content collection. In some embodiments, the digital content collection can be associated with the user's account with content management system 212. Likewise, as shown in step 310b, client device 202 can maintain a list of content items. The list of content items on client device 202 can also correspond to content items associated with the user. In particular, the list of content items on client device 202 can indicate content items in the user's digital content collection that are recognized by the client device 202.

In step 312, content management system 212 creates multiple thumbnail versions of each content item. For example, content management system 212 can create a high-resolution thumbnail image, medium-resolution thumbnail image, and a low-resolution thumbnail image of each content item in a user's digital content collection. In some embodiments, content management system 212 can create additional thumbnail versions of a content item, such as a full-screen thumbnail image that matches the dimension of a mobile device such as a particular smart phone or tablet. In some embodiments, content management system 212 can store the thumbnails versions for each content item stored on server device 206.

As shown in step 314, thumbnail caching system 100 compares the lists of content items to identify content items missing on client device 202. In particular, thumbnail caching system 100 can receive the list from content management system 212 and can compare the content items on the received list with a locally stored list to identify content items not found on the local content items list. In this manner, thumbnail caching system 100 can identify new content items and/or content items that should be downloaded to client device 202. Alternatively, each time a new content item is added to content management system 212, content management system 212 may send a notification of the new content item to thumbnail caching system 100.

In step 316, thumbnail caching system 100 determines which thumbnails to download from the identified content item. Specifically, for content items that thumbnail caching system 100 identifies as missing from client device 202, thumbnail caching system 100 can determine whether a content item should be downloaded to client device 202. As described above, thumbnail caching system 100 may determine which thumbnails to download for a content item based on the available storage space on the client device 202 (e.g., based on when the storage threshold limit will be reached).

After thumbnail caching system 100 determines which thumbnails to download, thumbnail caching system 100 can request the thumbnails, as step 318 illustrates. In response, content management system 212 can provide the requested thumbnails to thumbnail caching system 100. In particular, content management system 212 can identify the requested thumbnails for each content item stored on server device 206. Further, content management system 212 can download the requested thumbnails to the client device 202, as shown in step 320.

In step 322, thumbnail caching system 100 checks the storage threshold limit and purges thumbnails if necessary. More specifically, thumbnail caching system 100 can determine whether the storage threshold limit has been exceeded after downloading the requested thumbnails. If so, thumbnail caching system 100 can purge one or more thumbnails on the client device 202 until the storage threshold limit is no longer exceeded. Additional detail regarding adding and purging thumbnails is provided below in connection with the subsequent figures.

In step 324, thumbnail caching system 100 updates the list of content items maintained on client device 202. For example, thumbnail caching system 100 can update the list to reflect which thumbnails are downloaded and stored on client device 202. Further, thumbnail caching system 100 can update the list to indicate content items and/or thumbnails that the thumbnail caching system 100 would download given additional storage capacity on client device 202.

Steps 314-324 can repeat as new content items are added to the content management system 212. In other words, as thumbnail caching system 100 identifies new content items being added to the content management system 212, thumbnail caching system 100 can download thumbnails of the content items to client device 202 and purge less important thumbnails on client device 202 when the storage threshold limit is exceeded. In this manner, thumbnail caching system 100 can maintain an up-to-date listing of content items of a user's digital collection and provide the user with the highest ranked thumbnails on client device 202.

In one or more embodiments, thumbnail caching system 100 performs the steps of 314-324 in the background on client device 202, without user intervention. Thus, as a user adds content items to content management system 212, or co-users share content items with the user, thumbnail caching system 100 automatically identifies the content items, identifies thumbnails of the content items, and downloads the thumbnails to client device 202. Then, when a user accesses his or her digital content collection via a content application on client device 202, the user can access the thumbnails that are pre-loaded on client device 202.

Figure 4A:
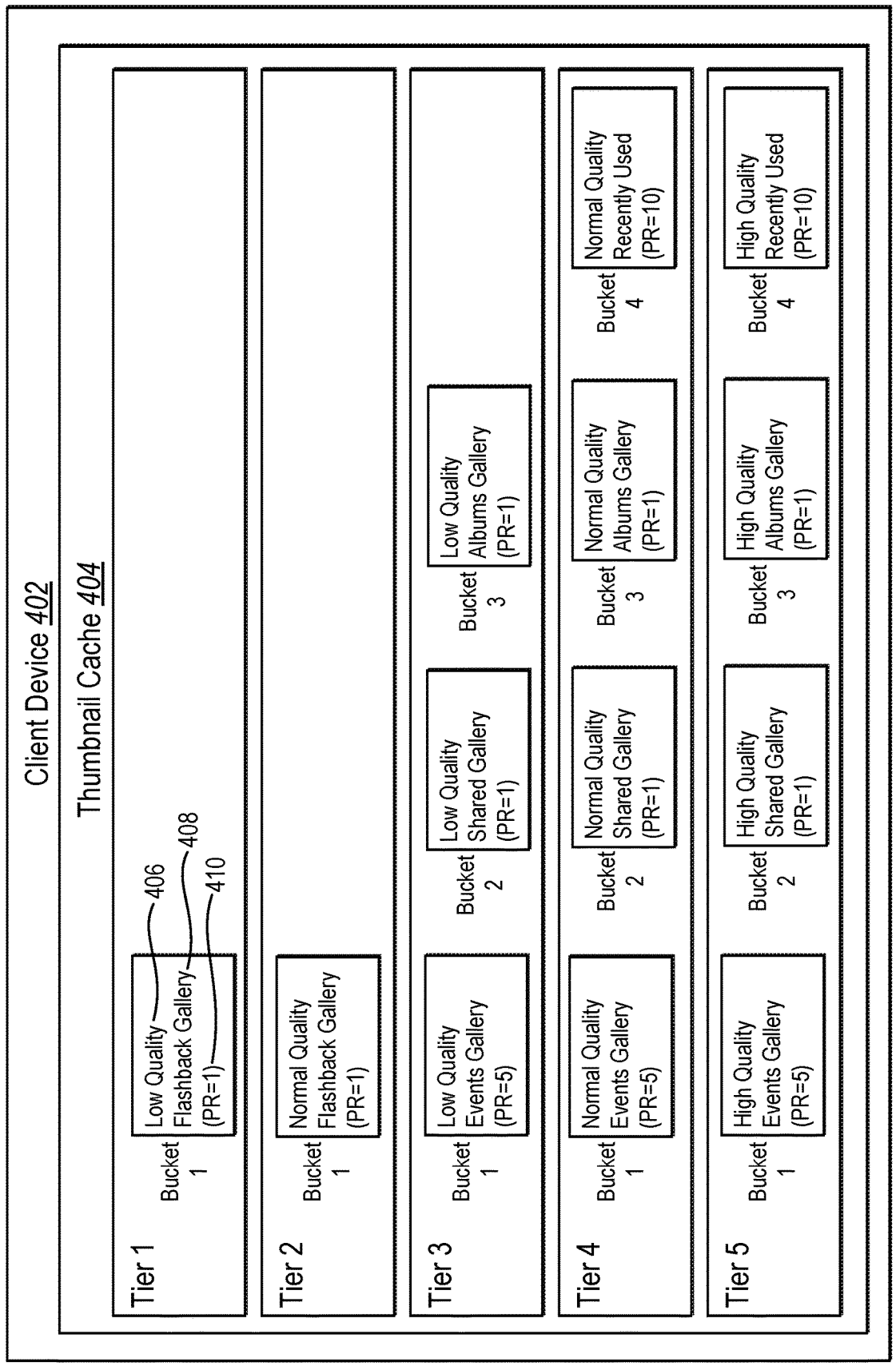
FIG. 4A illustrates an example of a dynamic thumbnail cache on a client device in accordance with one or more embodiments.

FIG. 4A illustrates an example of thumbnail cache on a client device 402. Client device 402 may be an example embodiment of client device 202 described above. For example, client device 402 may communicate with content management system 212, as described above. As shown, client device 402 includes a thumbnail cache 404 that houses prioritized tiers and buckets. For example, thumbnail cache 404 may be located in thumbnail cache database 108 and include prioritized tiers 118 and buckets 120 described above with respect to FIG. 1.

As FIG. 4A illustrates, thumbnail cache 404 includes five prioritized tiers, which range from Tier 1 to Tier 5, where Tier 1 is the highest prioritized tier and Tier 5 is the lowest prioritized tier. One will appreciate that thumbnail cache 404 can include additional prioritized tiers or fewer prioritized tiers than illustrated. Further, when prioritized tiers are prioritized from highest priority to lowest priority, one will appreciate that the prioritized tiers can be prioritized using various methods of prioritization, ranking, and/or ordering (e.g., lowest to highest).

Each of the prioritized tiers includes at least one bucket. As shown in FIG. 4A, Tier 1 and Tier 2 each include a single bucket, Tier 3 includes three buckets, and Tier 4 and Tier 5 each include four buckets. One will appreciate that a prioritized tier can include any number of buckets.

Each bucket within thumbnail cache 404 is associated with a unique pairing of attributes. In particular, each bucket is associated with a unique pairing between a thumbnail quality attribute 406 and a gallery attribute 408. For example, Bucket 1 in Tier 1 is associated with the attribute pairing of "low quality" and "flashback gallery." Thus, thumbnails that are low quality (i.e., low resolution) and that are assigned to the flashback gallery will be placed in Bucket 1 within Tier 1. As another example, Bucket 3 in Tier 4 is associated with the attribute pairing of "normal quality" and "albums gallery." As such, thumbnails that are normal quality (i.e., medium resolution) and that are assigned to the albums gallery will be placed in Bucket 3 within Tier 4.

As an example, when a thumbnail caching system (e.g., thumbnail caching system 100) identifies a new content item stored by a content management system (e.g., content management system 112), the thumbnail caching system can assign the content item, along with thumbnails derived from the content item, to one or more galleries, as described above. Then, using the pairings of quality attributes and gallery attributes associated with the buckets of thumbnail cache 404, thumbnail caching system 100 can assign the content item and the thumbnails to the buckets.

In some embodiments, the thumbnail caching system places a thumbnail in multiple buckets. For example, the thumbnail caching system may place a low quality thumbnail of a content item assigned to the events gallery and the albums gallery in Bucket 1 and Bucket 3 of Tier 3. In other words, if a content item has multiple gallery assignments, the thumbnail caching system may place a particular thumbnail of that content item in multiple buckets. In some instances, the buckets holding the thumbnail may be located in different prioritized tiers. For instance, the thumbnail caching system can place a thumbnail having a normal quality attribute and being assigned to the flashback gallery and the events gallery in Bucket 1 of Tier 2 and in Bucket 1 of Tier 4.

As shown in FIG. 4A, thumbnail cache 404 includes buckets for thumbnails assigned to a flashback gallery, an events gallery, a shared gallery, and an albums gallery. For purposes of explanation, an overview of the various galleries will now be given.

A flashback gallery may include one or more content items that are historic in nature, such as content items that have reached a predetermined age or benchmark (e.g., one month, six months, one year, two years, five years, 100 days, 1,000 days, etc.). For example, each week, the thumbnail caching system may replace content items currently in the flashback gallery with content items that were taken during the same week in previous years. To illustrate, for the week including October 31, the thumbnail caching system may identify Halloween pictures from previous years and include those pictures in the flashback gallery. In some cases, the thumbnail caching system may select a limited number of content items for each previous benchmark having historic content items. For instance, for each previous year that has Halloween picture available, the thumbnail caching system can select two or three Halloween pictures from each year.

A events gallery may include a copy of all content items in a user's digital content collection. Thus, each content item captured by the user or shared with the user, and not deleted or hidden by the user, can be included in the events gallery. In this manner, when the user is viewing the events gallery, the user can view all of his or her content items, or a thumbnail of each content item, in a single gallery. The events gallery can be organized associated into a plurality of subsets corresponding to a plurality of events. To illustrate, in some embodiments, each subset can correspond to a particular day, week, holiday, trip, sporting event, party, meeting, An example of the events gallery is described with respect to FIG. 7.

A shared gallery can include content items shared with the user and/or shared by the user. In some instances, the shared gallery can include sub-galleries. For example, the shared gallery can include one sub-gallery for content items shared between the user and a particular co-user and another sub-gallery for content items shared among a specific group of co-users including the user.

An album gallery can include content items that are tagged or designated with a label by a user. Like the shared gallery, the album gallery may include sub-galleries. For example, the album gallery may include sub-galleries such as "Summer Vacation 2015," "Best Friends," "Stephanie's Wedding," etc., where each sub-gallery includes one or more corresponding tagged content items. In addition, a user may tag content items or the thumbnail caching system may automatically tag groups of content items.

FIG. 4A also shows a gallery for recently used content items (shown only as "recently used") that includes last recently used content items. Recently used content items can include content items that a user has recently shared, tagged, downloaded a full-version of, viewed, or otherwise accessed. The number of content items assigned to the gallery for recently used content items can include a pre-defined number of items (e.g., thirty items, or 3% of the thumbnail cache storage size) or all content items used within an elapsed time (e.g., used within three days, one week, two weeks, one month, etc.).

In some embodiments, the thumbnail caching system can include the recently used content items in a gallery or repository that is inaccessible to a user. For example, when a user again uses a recently used content item, the thumbnail caching system can quickly recall the content item because it is located in the recently used collection, however, there is not recently used gallery that a user can view. Alternatively, the thumbnail caching system can include recently used content items in a recently used gallery accessible by the user.

Further, while FIG. 4A shows one recently used bucket in each of Tier 4 and Tier 5, in some embodiments, thumbnail cache 404 may include a number of recently used buckets, including recently used buckets tied to one or more galleries. For example, Tier 2 could also include a recently used bucket for normal quality thumbnails assigned to the events gallery (e.g., tied to Bucket 1 in Tier 4). In this manner, normal resolution thumbnails that a user recently accesses or uses, or in some instances recently views, are downloaded to client device 402 and readily available to the user.

While not shown in FIG. 4A, thumbnail cache 404 can include additional galleries. For example, a thumbnail cache can include a hidden gallery that includes content items that a user has chosen to be hidden from the events gallery or other galleries. Additional examples of galleries include galleries associated with content item types (e.g., photos, videos, slow-motion, panoramic, time-lapse, etc.). The thumbnail caching system can also include a favorites gallery, or a recently deleted gallery, where content items are purged from the content management system a set number of days after being deleted by the user.

Returning to FIG. 4A, each bucket includes a proportion ratio 410. When multiple buckets are located in the same prioritized tier, the thumbnail caching system can use the proportion ratio from each bucket in the tier to batch download thumbnails belonging to the buckets. The thumbnail caching system can also use the proportion ratio in determining from which buckets to remove thumbnails when purging thumbnails from the thumbnail cache 402, as described below.

Generally, when first building thumbnail cache 404, the thumbnail caching system will start downloading thumbnails in Tier 1. More specifically, the thumbnail caching system will download all the thumbnails in Bucket 1 of Tier 1. When all the thumbnails in Tier 1 are downloaded to client device 402, the thumbnail caching system will begin downloading thumbnails in Tier 2. The thumbnail caching system will continue to download thumbnails from the buckets from Tier 3, Tier 4, and Tier 5, in accordance with the prioritization of the tiers, as long as the storage threshold limit is not exceeded.

Each time the thumbnail caching system moves to a new prioritized tier, the thumbnail caching system can download thumbnails from the tier in proportional batches. More specifically, the thumbnail caching system can register and download thumbnails in each bucket within a prioritized tier in a round-robin format according to the proportion ratios assigned to the buckets in the prioritized tier. For example, when the thumbnail caching system begins downloading thumbnails for Tier 4, the thumbnail caching system can download the thumbnails according to the proportion ratios assigned to the buckets in Tier 4. Thus, in an example batch from Tier 4, the thumbnail caching system can download five thumbnails from Bucket 1, one thumbnail from Bucket 2, one thumbnail from Bucket 3, and ten thumbnails from Bucket 4. As such, for every five thumbnails the thumbnail caching system downloads for Bucket 1 in Tier 4, the thumbnail caching system downloads one thumbnail from Bucket 2, one thumbnail from Bucket 3, and ten thumbnails from Bucket 4.

The thumbnail caching system may continue to apply the proportion ratio for each bucket in the batch download as long as the buckets have thumbnails to be downloaded. Then, when only one bucket is left in the prioritized tier with thumbnails to be downloaded, the thumbnail caching system can download the thumbnails in that bucket until the storage threshold limit is reached or until the thumbnails in the bucket are all downloaded. By using proportional batches, the thumbnail caching system can proportionally distribute thumbnails within a prioritized tier. As such, if the thumbnail caching system reaches the storage threshold limit mid tier, the thumbnail caching system will have intelligently distributed out the thumbnails among the buckets in the prioritized tier.

Figure 4B:
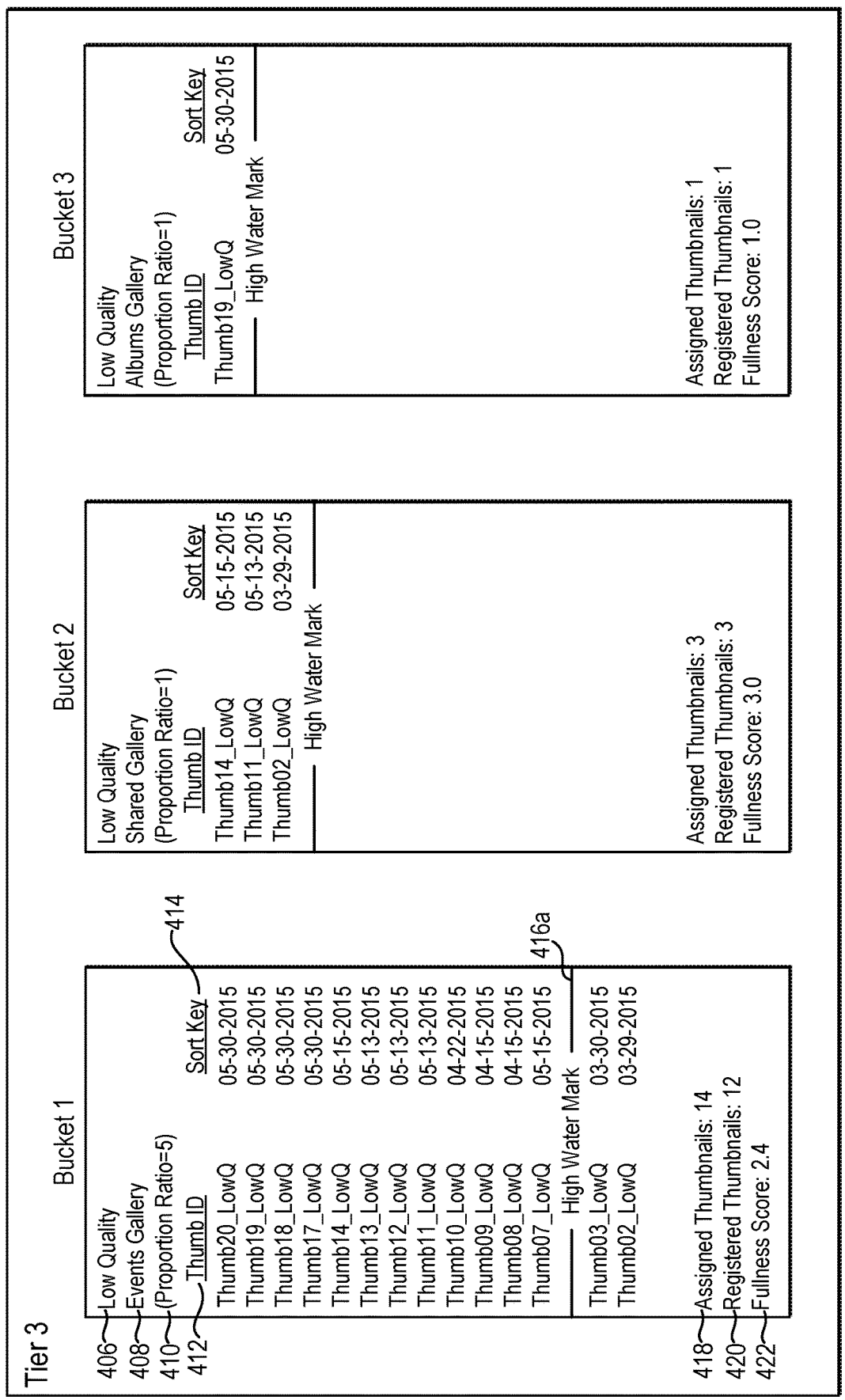
FIGS. 4B-4C illustrate example thumbnail lists belonging to a tier from the dynamic thumbnail cache shown in FIG. 4A in accordance with one or more embodiments.
Figure 4C:
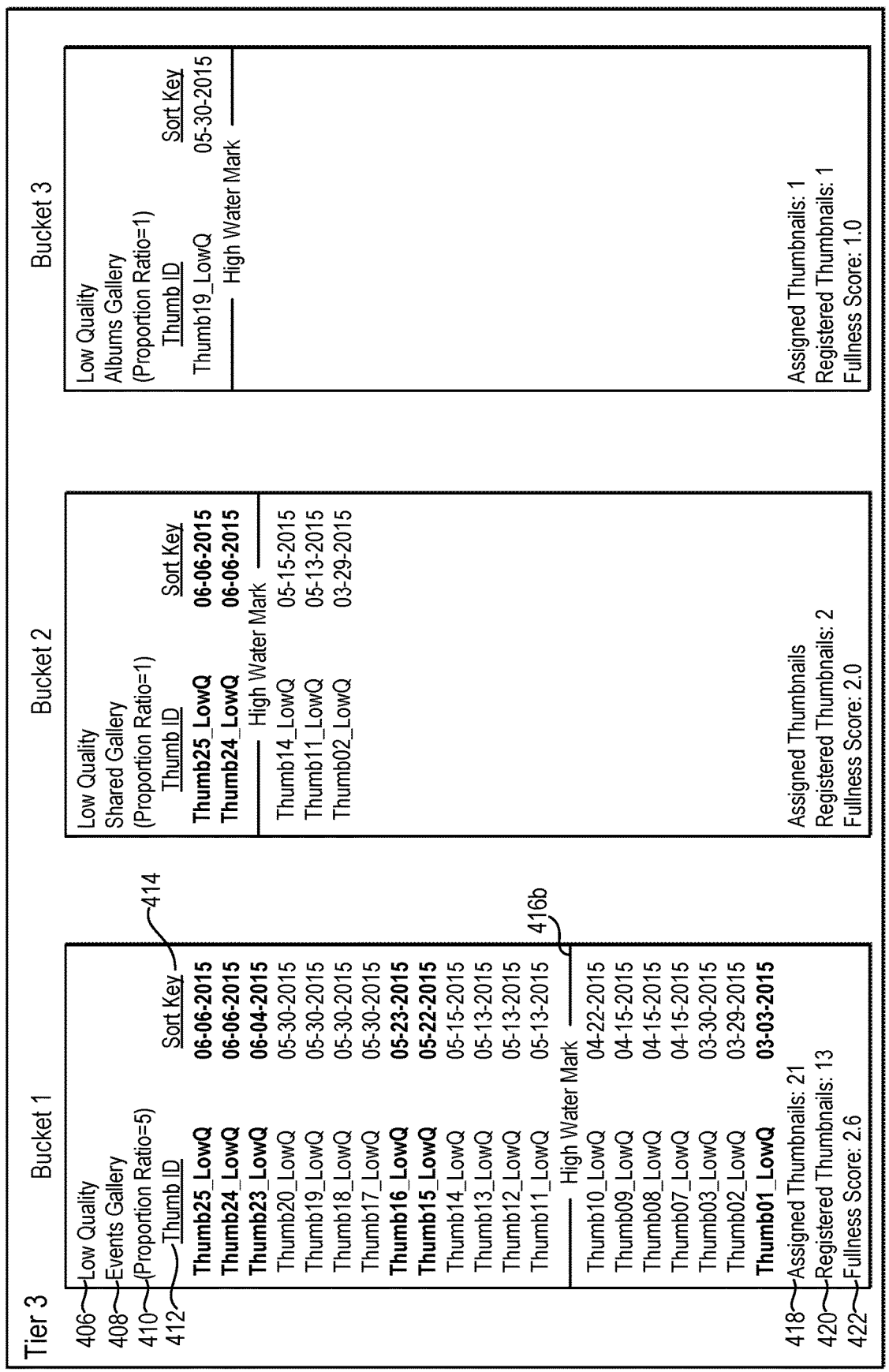

FIGS. 4B-4C illustrate example thumbnail lists belonging to Tier 3 from thumbnail cache 404 shown in FIG. 4A. In particular, FIG. 4B illustrates a list of thumbnails in Bucket 1, Bucket 2, and Bucket 3 of Tier 3, and FIG. 4C illustrates an updated list of thumbnails in Bucket 1, Bucket 2, and Bucket 3 of Tier 3 after additional thumbnails have been added to thumbnail cache 404 and other thumbnails removed (because the storage threshold limit was exceeded).

As shown in FIGS. 4B and 4C, each bucket includes a quality attribute 406, a gallery attribute 408, and a proportion ratio 410. In addition, each bucket includes a listing 412 of thumbnails IDs sorted by sort key 414 using a sort order. As shown, the sort key 414 for each thumbnail represents a date and the thumbnails are sorted according to recency (i.e., reverse chronological order). As described above, the date may be the creation date, last used date, or another date. In other embodiments, the sort key may be a ranked number (e.g., 1-x) or another factor, and the thumbnails may be sorted using a variety of sort techniques.

As also shown in FIGS. 4B and 4C, each bucket includes a count of the number of assigned thumbnails 418, registered thumbnails 420, and a fullness score 422. Each bucket also includes a high water mark, such as high water mark 416a in FIG. 4B and high water mark 416b in FIG. 4C. The high water mark indicates the point in each bucket between assigned and registered thumbnails versus assigned only thumbnails. Thus, while all thumbnails in a bucket are assigned to the bucket, only registered thumbnails in a bucket are downloaded to the client device. The high water mark represents the point where the maximum number of relevant (e.g., highest ranked) thumbnails in a prioritized tier have been downloaded before the storage threshold limit is reached.

As described above, the thumbnail caching system registers and downloads thumbnails tier-by-tier in accordance with the prioritization of the prioritized tiers. The thumbnail caching system continues to register and download thumbnails until the storage threshold limit is reached. The thumbnail caching system can download thumbnails in batches based on the proportion ratios assigned to the buckets in the prioritized tier. Alternatively, the thumbnail caching system can download thumbnails in batches based on payload size (e.g., download groups of thumbnails up to 500 kilobytes, 1 megabyte, 5 megabytes, etc.).

A specific example will now be given with reference to FIGS. 4B and 4C. As shown in FIG. 4B, thumbnails are assigned to Bucket 1, Bucket 2, and Bucket 3 of Tier 3. Specifically, Bucket 1 has 14 assigned thumbnails, 12 registered thumbnails, and a fullness score of 2.4. Bucket 2 has 3 assigned thumbnails, 3 registered thumbnails, and a fullness score of 3.0. Bucket 3 has 1 assigned thumbnail, 1 registered thumbnail, and a fullness score of 1.0.

In addition, high water mark 416a in Bucket 1 separates the registered thumbnails from the non-registered thumbnails. As such, the thumbnail caching system only requests and downloads the registered thumbnails. By maintaining a high water mark in each bucket, the thumbnail caching system can prevent exceeding the storage threshold limit by downloading too many thumbnails to the thumbnail cache 404. Further, as will be discussed below, the high water mark helps the thumbnail caching system determine whether to download newly identified content items.

Because of the proportion ratios of the buckets in Tier 3, Bucket 1 includes thumbnails (i.e., Thumb02_LowQ, and Thumb03_LowQ) below the high water mark while Bucket 2 and Bucket 3 do not. By way of illustration, as the thumbnail caching system filled up buckets in Tier 3, the thumbnail caching system downloaded, according to the proportion ratio of the buckets, the top five thumbnails in Bucket 1 (i.e., Thumb20_LowQ, Thumb19_LowQ, Thumb18_LowQ, Thumb17_LowQ, and Thumb14_LowQ), the top thumbnail in Bucket 2 (i.e., Thumb14_LowQ), and the top thumbnail in Bucket 3 (i.e., Thumb19_LowQ).

Note that, in one or more embodiments, the thumbnail caching system may only download Thumb19_LowQ and Thumb14_LowQ once even though each thumbnail is registered to multiple buckets in Tier 3. Thus, while Thumb19_LowQ and Thumb14_LowQ are counted individually in each bucket to which they belong, the thumbnail caching system can count then once when determining the size of thumbnail cache 404 and whether thumbnail cache 404 is approaching or exceeds the storage threshold limit.

After the first batch is downloaded, the thumbnail caching system continues to download batches of thumbnails from Tier 3 as long as the storage threshold limit is not exceeded. Then, the thumbnail caching system can move the high water mark in each bucket to below the newly downloaded thumbnails.

Returning to the illustration, again following the proportion ratios of the buckets, the thumbnail caching system can register the next top five thumbnails in Bucket 1 (i.e., Thumb13_LowQ, Thumb12_LowQ, Thumb11_LowQ, Thumb10_LowQ, and Thumb09_LowQ) and the next top thumbnail in Bucket 2 (i.e., Thumb11_LowQ). Because all the thumbnails are downloaded in Bucket 3, the thumbnail caching system can omit Bucket 3 for subsequent batch registrations and downloads. Based on the second batch, the thumbnail caching system can download the next set of thumbnails.

After downloading the second batch of registered thumbnails, the thumbnail caching system can determine that thumbnail cache 404 is within a margin of the storage threshold limit. For example, thumbnail cache 404 may be within a predefined storage capacity (e.g., 1.5 megabytes) of the storage threshold limit. Based on this determination, in one or more embodiments, the thumbnail caching system can determine not download any additional thumbnails. In another embodiment, the thumbnail caching system may determine to download one last batch of thumbnails.

In still another embodiment, the thumbnail caching system may determine to register and download a partial batch of thumbnails. For example, as shown in FIG. 4B, the thumbnail caching system may register two thumbnails (i.e., Thumb08_LowQ and Thumb07_LowQ) from Bucket 1 and one thumbnail (i.e., Thumb02_LowQ) from Bucket 2. Upon downloading the registered thumbnails, the thumbnail caching system may update the high water marks in the buckets to the levels shown in FIG. 4B. Further, the thumbnail caching system may determine that the size of thumbnail cache 404 satisfies the storage threshold limit and that the thumbnail cache 404 is in a steady state.

As another note, Thumb02_LowQ is assigned to Bucket 1 and Bucket 2, but is only registered to Bucket 2. Thus, in some embodiments, because Thumb02_LowQ is not registered to the events gallery, Thumb02_LowQ generally will not appear in the events gallery on client device 402 even though it is downloaded to thumbnail cache 404. Rather, a user will only be able to view Thumb02_LowQ in the shared gallery. In alternative embodiments, the thumbnail caching system can detect that Thumb02_LowQ is located in thumbnail cache 404 and display Thumb02_LowQ in the events gallery even though it falls below the high water mark (i.e., is not registered to the events gallery). The thumbnail caching system can display Thumb02_LowQ in the events gallery as long as Thumb02_LowQ is registered to the shared gallery (and/or not purged from the thumbnail cache 404).

As mentioned above, each bucket displays a fullness score. In some embodiments, the fullness score is a factor of the number of registered thumbnails in a bucket divided by the proportion ratio assigned to the bucket. To illustrate, Bucket 1 has a fullness score of 2.4 or 12 registered thumbnails divided by the proportion ratio of 5. As the number of registered thumbnails increase or decrease in a bucket, the thumbnail caching system can update the fullness score for the bucket.

Turning to FIG. 4C, FIG. 4C illustrates Tier 3 of thumbnail cache 404 in a steady state after the thumbnail caching system has registered additional content items and unregistered other content items. As an illustrative example, the thumbnail caching system identifies additional content items and thumbnails of the additional content items. The thumbnail caching system further identifies that a number of the thumbnails are assigned to buckets within Tier 3 (additional thumbnails are bold in FIG. 4C for convenience). Specifically, the thumbnail caching system identifies Thumb25_LowQ, Thumb24_LowQ, Thumb23_LowQ, Thumb16_LowQ, Thumb15_LowQ, and Thumb01_LowQ, which are assigned to Bucket 1 in Tier 3.

Additionally, the thumbnail caching system identifies that Thumb25_LowQ and Thumb24_LowQ are also assigned to Bucket 2. Because the buckets in Tier 3 were in a steady state before the additional thumbnails were identified, the thumbnail caching system can only add thumbnails that are above the high water mark. Further, adding thumbnails to a bucket will cause thumbnail cache 404 to exceed the storage threshold limit, and thus, the thumbnail caching system must remove lower ordered thumbnails from buckets within the prioritized tier to balance adding the additional thumbnails.

Continuing the above example, the thumbnail caching system identifies that Thumb25_LowQ, Thumb24_LowQ, Thumb23_LowQ, Thumb16_LowQ, and Thumb15_LowQ, which are assigned to Bucket 1, have sort keys above high water mark 416a (shown in FIG. 4B), and that Thumb01_LowQ has a sort key below high water mark 416a. Thus, the thumbnail caching system registers and downloads the additional thumbnails besides Thumb01_LowQ, which the thumbnail caching system does not registered and or downloaded. The thumbnail caching system performs a similar operation by registering Thumb25_LowQ and Thumb24_LowQ in Bucket 2. In registering and/or downloading the additional thumbnails, the thumbnail caching system can again adhere to the proportion ratios assigned to Bucket 1 and Bucket 2.

As mentioned above, if the size of the thumbnail cache 404 exceeds the storage threshold limit, the thumbnail caching system can purge thumbnails until the size of thumbnail cache 404 is below the storage threshold limit. The thumbnail caching system can use the fullness score to purge thumbnails from thumbnail cache 404. To illustrate, after a first batch of additional thumbnails are added to Bucket 1 (e.g., Thumb25_LowQ, Thumb24_LowQ, Thumb23_LowQ, Thumb16_LowQ, and Thumb15_LowQ) and Bucket 2 (Thumb25_LowQ) according to the assigned proportion ratios, Bucket 1 may have 17 downloaded thumbnails (e.g., the 12 shown in FIG. 4B plus the 5 added thumbnails above high water mark 416a), resulting in a fullness score of 3.4. Bucket 2 may have 5 thumbnails (e.g., the 3 shown in FIG. 4B plus the 2 added thumbnails), resulting in a fullness score of 5.0. Bucket 3 maintains a fullness score of 1.0.

Because Bucket 2 has the highest fullness score, the thumbnail caching system first unregisters the lowest ordered thumbnail (i.e., Thumb02_LowQ) from Bucket 2. Upon unregistering and purging Thumb02_LowQ, the high water mark moves up above Thumb02_LowQ in Bucket 2 and the thumbnail caching system updates the fullness score for Bucket 2 to from 5.0 to 4.0 to reflect unregistering one thumbnail. Even though the fullness score of Bucket 2 was reduced from 5.0 to 4.0 upon unregistering Thumb02_LowQ, the updated fullness score of Bucket 2 is still larger than the fullness score of Bucket 1 (e.g., 3.4) and Bucket 3 (e.g., 1.0). As such, if the storage threshold limit is still exceeded, the thumbnail caching system unregisters the next-lowest ordered thumbnail in Bucket 2 (i.e., Thumb11_LowQ). Unregistering Thumb11_LowQ causes Bucket 2 to have a fullness score of 3.0. As a result, Bucket 2 then has a lower fullness score than Bucket 1. Again, the thumbnail caching system moves up the high water mark in Bucket 2 above Thumb11_LowQ upon unregistering Thumb11_LowQ.

When a thumbnail is unregistered from every bucket to which it is assigned, the thumbnail caching system can delete the thumbnail from thumbnail cache 404 and free up space. For example, upon Thumb02_LowQ being unregistered from Bucket 2, the thumbnail caching system purges Thumb02_LowQ from thumbnail cache 404. Upon unregistering Thumb11_LowQ from Bucket 2, however, the thumbnail caching system can not purge Thumb11_LowQ because Thumb11_LowQ is still registered in Bucket 1. Thus, unregistering a thumbnail from a bucket does not necessarily result in the thumbnail being removed from thumbnail cache 404 and reducing the size of thumbnail cache 404.

The thumbnail caching system continues to unregister thumbnails until enough thumbnails are purged such that the storage threshold limit is no longer exceeded. Thus, continuing the above illustration, because Bucket 1 now has a higher fullness score (e.g., 3.4) than Bucket 2 (e.g., 3.0), the thumbnail caching system will unregister the lowest registered thumbnail (e.g., Thumb07_LowQ) from Bucket 1. In this illustration, as the thumbnail caching system unregisters Thumb07_LowQ and Thumb08_LowQ in Bucket 1, the fullness score of Bucket 1 reduces from 3.4 to 3.0 respectively.

At this point, Bucket 1 and Bucket 2 have fullness scores of 3.0. If the storage threshold limit is still exceeded, the thumbnail caching system can determine, based on one or more factors, from which bucket to unregister the next thumbnail. For example, the thumbnail caching system may identify the bottom-registered thumbnail in each bucket and unregister the thumbnail with the lowest sort key (e.g., Thumb09_LowQ in Bucket 1 has the oldest date). As another example, the thumbnail caching system can alternate buckets, and thus, because the thumbnail caching system last unregistered a thumbnail from Bucket 1, the thumbnail caching system unregisters Thumb14_LowQ from Bucket 2. In another example, the thumbnail caching system can unregister a thumbnail from the bucket that has the highest (or lowest) number of registered thumbnails or assigned thumbnails. In still another example, the thumbnail caching system can unregister thumbnails from both buckets.

To arrive at the new steady state shown in FIG. 4C, the thumbnail caching system unregisters two more thumbnails from Bucket 1 (i.e., Thumb09_LowQ and Thumb10_LowQ) and one thumbnail from Bucket 2 (i.e., Thumb14_LowQ). In this steady state, Bucket 1 has a fullness score of 2.6 and Bucket 2 has a fullness score of 2.0. Further, FIG. 4C shows the updated high water marks in Bucket 1 and Bucket 2 in the steady state.

One will note, that Tier 3 includes the same number of uniquely registered thumbnails in the steady state in FIG. 4B as in the steady state in FIG. 4C, even though the division among buckets has changed. As such, if the added thumbnails are roughly the same size as the removed thumbnails, then the overall size of thumbnail cache 404 remains unchanged and below the storage threshold limit. In yet further examples, the thumbnail caching system can download and/or purge thumbnails from thumbnail cache 404 based on changes to the storage threshold limit, as discussed above.

Figure 5:
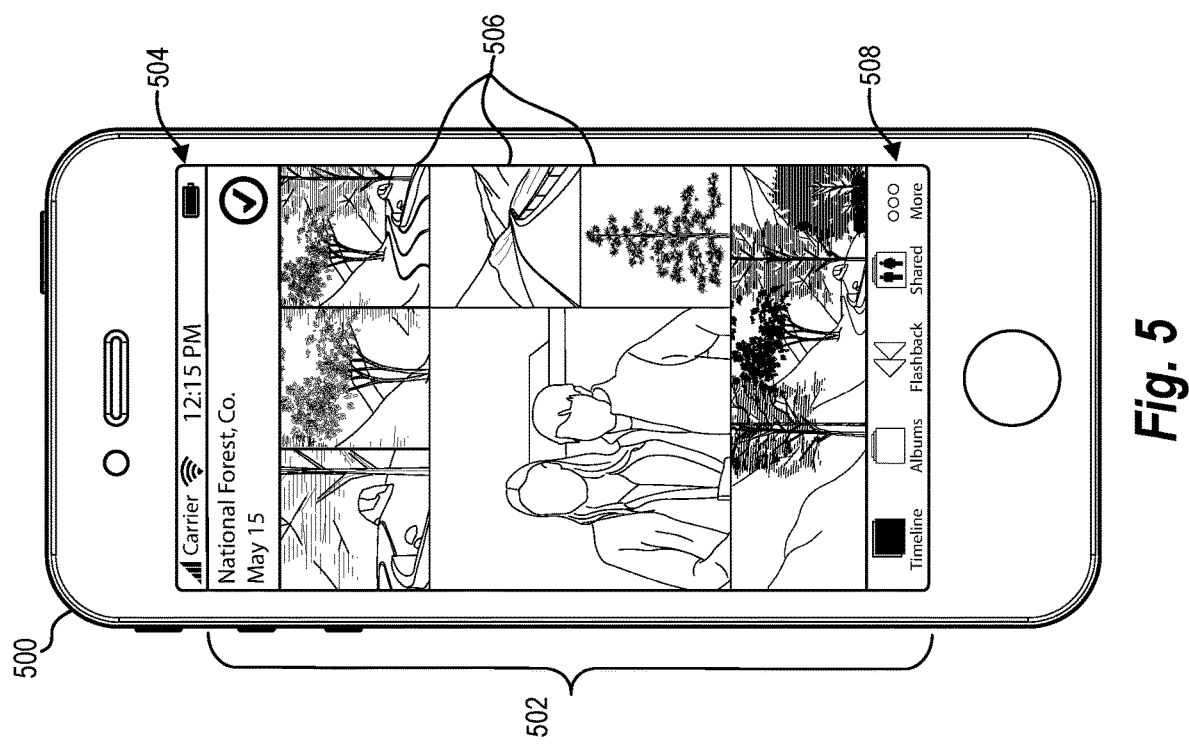
FIG. 5 illustrates an example of a graphical user interface including a presentation of digital content items in accordance with one or more embodiments.

FIG. 5 illustrates an example client device 500 including graphical user interface 502 provided via touchscreen 504. In particular, FIG. 5 illustrates an example client device 500 that may implement one or more features and functionalities described above in connection with client device 202 of FIGS. 2 and 3, and client device 402 of FIG. 4A.

The client device 500 comprises a touch-screen enabled hand-held device (e.g., a device sized and configured to be held and used in a single hand of a user). As discussed below in reference to FIGS. 8-9, other client devices (tablets, laptops, etc.) can implement the features and methods of various embodiments. Thus, the discussion of a touch-screen enabled hand-held device, and particularly a mobile phone, in FIG. 5, is to aid in the description of various features and methods of one or more embodiments.

Client device 500 can provide and display a digital content collection of content items via graphical user interface 502. More specifically, as illustrated in FIG. 5, graphical user interface 502 displays thumbnail images 506 of content items in a user's digital content collection. In addition to displaying thumbnail images 506 of content items, graphical user interface 502 can receive user input with regard to images in the digital content collection via touchscreen 504.

A content application can allow a user to navigate through thumbnail images 506 on client device 500. For example, a user can swipe up or down on touchscreen 504 to view the additional thumbnails 506 of content items from the digital content collection. In one or more embodiments, thumbnail images 506 of content items are arranged in chronological order. In such embodiments, when the user swipes down, the content application, which includes the thumbnail caching system, presents the later dated/time-stamped content items to the user. Similarly, upon the user swiping up, the content application presents earlier dated/time-stamped content items to the user. In alternative embodiments, the digital content items are arranged by location or another ordering scheme.

Additionally, as illustrated in FIG. 5, graphical user interface 502 can include graphical icons 508 that provide one or more selectable options and interactive features within graphical user interface 502. For example, the timeline icon (shown as selected in FIG. 5) provides thumbnails assigned to and registered in the events gallery to the user within graphical user interface 502. The album icon, when selected, displays one or more thumbnail images associated with thumbnails registered in the albums gallery on graphical user interface 502. As noted above, the album gallery may be subdivided into sub-galleries. The flashback icon, when selected, displays thumbnails of content items registered in the flashback gallery on graphical user interface 502. The shared icon, when selected, displays thumbnails of content items registered in the shared gallery, such as content item shared by the user with co-users, or content items shared by co-users on graphical user interface 502. The more icon provides the user with additional interactive options (e.g., share, edit, delete, print, etc., a content item), gallery views, and user-configurations.

The size of each thumbnail displayed in graphical user interface 502 may depend on which thumbnail versions are stored in the thumbnail cache of client device 500. For example, if client device 500 has a thumbnail cache that includes a high-resolution thumbnail image of each content item in the user's digital content collection, graphical user interface 502 may display larger thumbnail versions for the content items. Alternatively, based on additional factors, the content application may provide an assortment of thumbnail sizes and versions to display to the user within a gallery. For instance, as shown in FIG. 5, thumbnail images 506 in graphical user interface 502 show small, medium, and large thumbnails. As described above, the small sized thumbnails may be registered in a bucket of low quality thumbnails assigned to the events gallery in one prioritized tier, the medium sized thumbnails may be registered in a bucket of normal quality thumbnails assigned to the events gallery in another prioritized tier, and the large sized thumbnails may be registered in a bucket of high quality thumbnails assigned to the events gallery in still another prioritized tier.

Generally, the content application can download every low-quality images in a user's digital content collection to the thumbnail cache on a client device before the thumbnail cache reaches the storage threshold limit. In other words, the content application often get through the first three prioritized tiers shown in FIG. 4A before approaching the storage threshold limit because, in most cases, the cost, in terms of size, to maintain the low-resolution thumbnails is very low, even with limited storage space. Thus, in most cases, a client device can provide at least a small version of each content item in a user's digital content collection to the user.

In addition, in many cases, a client device can also accommodate normal quality thumbnails or medium-resolution thumbnails for content items in the user's digital content collection. Thus, graphical user interface 502 can intermix medium-sized versions of thumbnails when presenting thumbnail images 506 to the user. Further, when the thumbnail cache can accommodate high-resolution thumbnails of content items, graphical user interface 502 can also add larger thumbnails to a gallery presentation.

If, as mention above, the thumbnail cache has room to download only a portion of medium-resolution thumbnails and/or high-resolution thumbnails for a gallery before reaching the storage threshold limit, the content application may determine to show larger thumbnail versions in the gallery based on thumbnail version availability. For example, the content application may display the smaller images, or lower-resolution thumbnail images, in in FIG. 5 because the storage threshold limit was reached before larger resolutions of the content items could be downloaded.

In some embodiments, the content application makes an exception as to which thumbnail versions client device 500 includes. For example, the content application may determine to download thumbnails for a content item out of order of the prioritized tiers. To illustrate, for each gallery, before the content application registers and downloads thumbnails in proportional batches, the content application may download a set number of thumbnails such that, when the user views the gallery, graphical user interface 502 is filled in with thumbnail images rather than white space. The set number may vary based on the thumbnail version downloaded. For instance, a single high-resolution thumbnail may fill graphical user interface 502 while nine low-resolution thumbnails are required to fill the same area. Thus, if a user only has one content item in a gallery, such as the shared gallery, the content application may download a higher resolution thumbnail of the content item to fill up graphical user interface 502 when presenting the user with the shared gallery.

Figure 6:
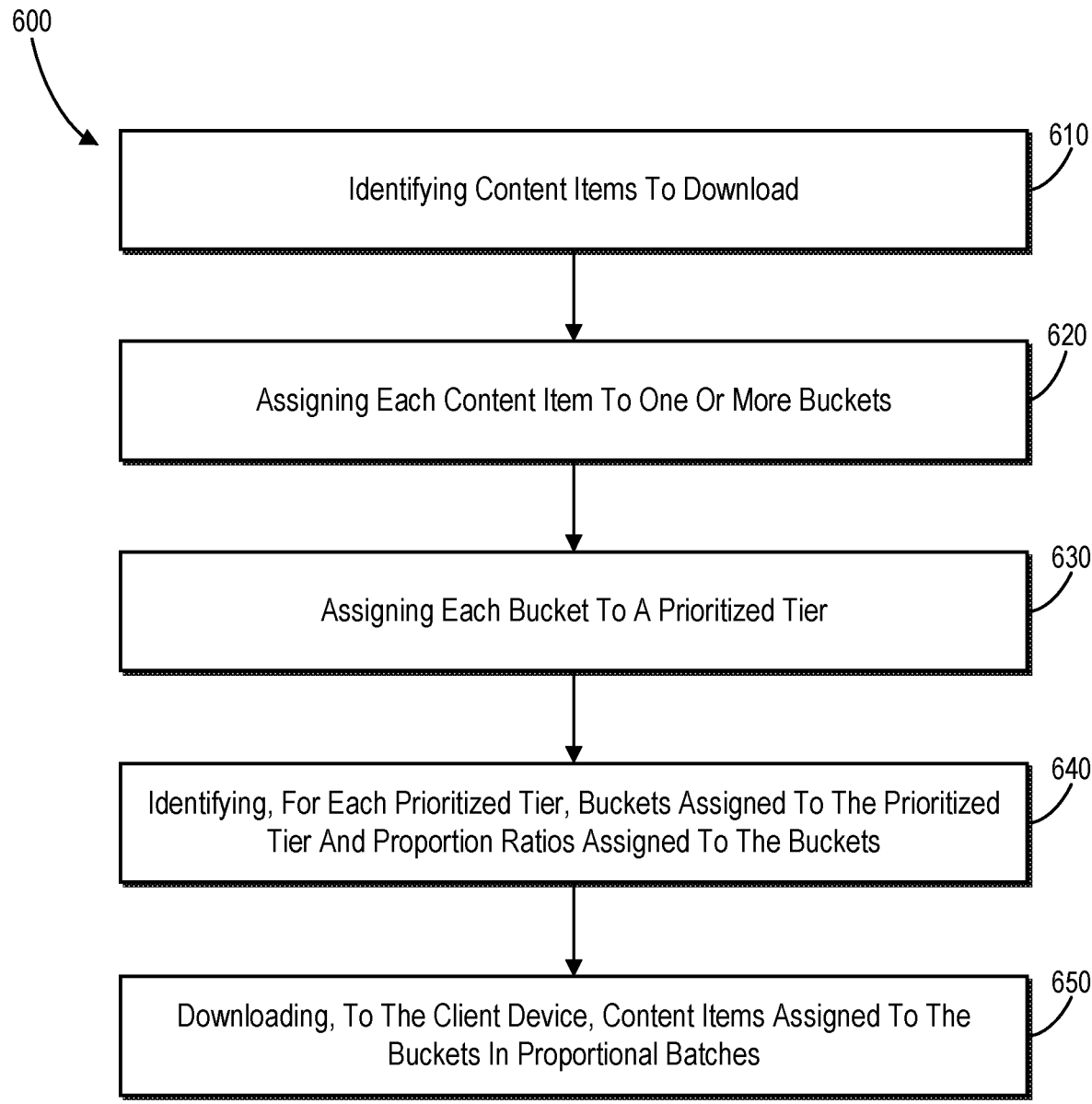
FIG. 6 illustrates a flowchart of a series of acts in a method of creating a dynamic thumbnail cache in accordance with one or more embodiments.
Figure 7:
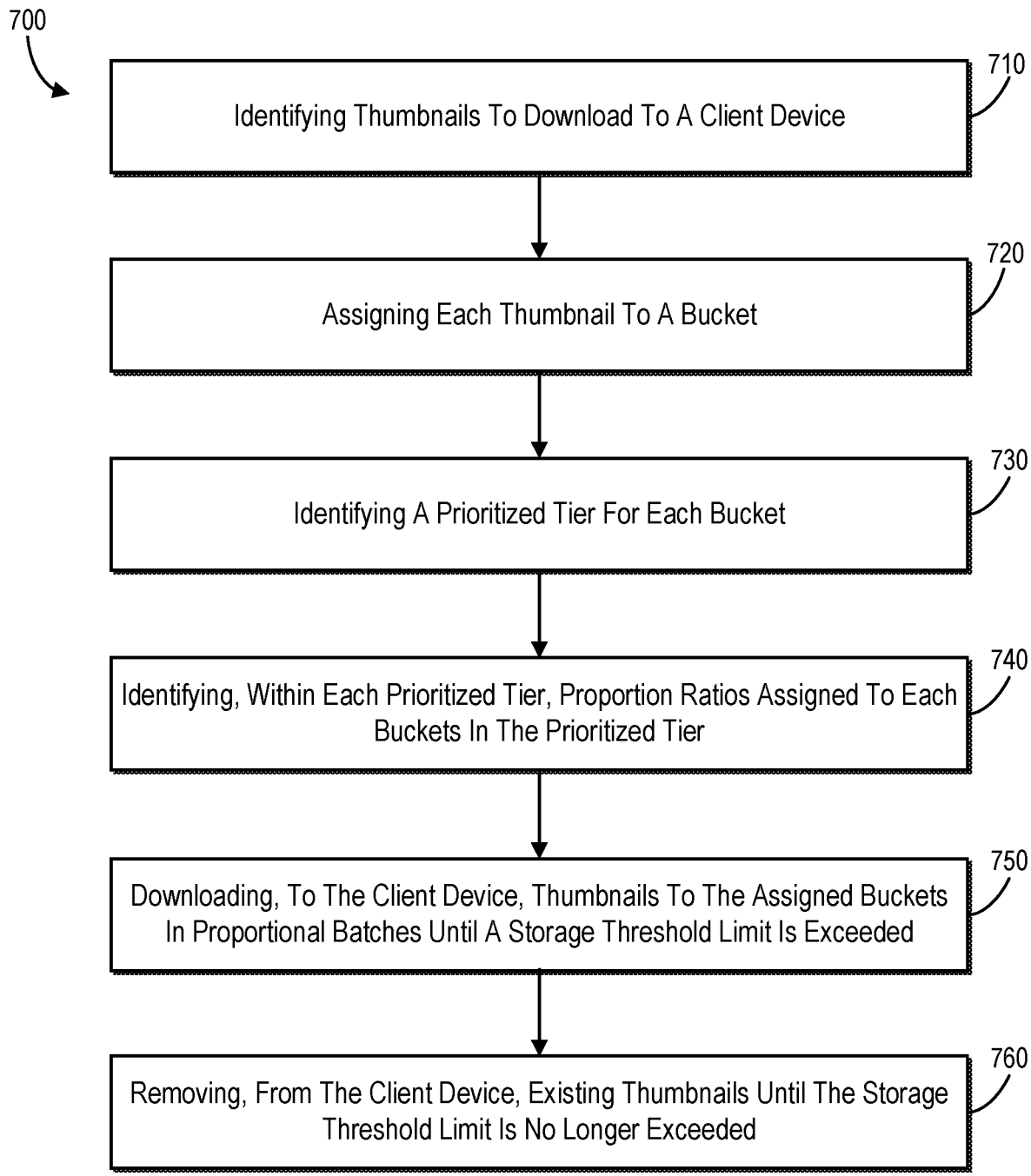
FIG. 7 illustrates a flowchart of a series of acts in another method of creating a dynamic thumbnail cache in accordance with one or more embodiments.

FIGS. 1-5, the corresponding text, and the examples, provide a number of different systems and devices for creating a dynamic thumbnail cache on a client device. In addition to the foregoing, one or more embodiments can also be described in terms of flowcharts comprising acts and steps in a method for accomplishing a particular result. For example, FIGS. 6 and 7 illustrate flowcharts of exemplary methods in accordance with one or more embodiments. The methods described in relation to FIGS. 6 and 7 may be performed with less or more steps/acts or the steps/acts may be performed in differing orders. Additionally, the steps/acts described herein may be repeated or performed in parallel with one another or in parallel with different instances of the same or similar steps/acts. Furthermore, the thumbnail caching system can perform each of the acts described in relation to FIGS. 6 and 7 automatically without user input.

FIG. 6 illustrates a flowchart of one example method 600 for creating a dynamic thumbnail cache. While FIG. 6 illustrates example steps according to one embodiment, other embodiments may omit, add to, reorder, and/or modify any of the steps shown in FIG. 6. One or more steps shown in FIG. 6 may be performed by any of the components illustrated in communication system 200 illustrated in FIG. 2. Further, one or more steps of method 600 may be performed by client device 202, 402, 500, server device 206, or a combination of both a client device and a server device.

Method 600 includes act 610 of identifying content items to download. In particular, act 610 may involve identifying a plurality of content items to download to a client device 202, 402, 500. For example, act 610 may include identifying content items based on comparing lists of content items between content management system 212 and client device 202. In one or more embodiments, act 610 may involve identifying a plurality of thumbnail images for each of the plurality of content items. In some embodiments, the plurality of thumbnail images for each of the plurality of images includes a range of different thumbnail resolutions of each of the plurality of content items.

Method 600 further includes act 620 of assigning each content item to one or more buckets. In particular, act 620 may involve assigning each content item from the plurality of content items to one or more of a plurality of buckets, where each bucket is associated with a unique pair of attributes. For example, act 620 may include assigning each content item to a bucket based on a gallery interest attribute 408 and a thumbnail quality attribute 406 associated with the content item.

Method 600 may further include act 630 of assigning each bucket to a prioritized tier. In particular, act 630 may involve assigning each of the plurality of buckets to one of a plurality of prioritized tiers. For instance, act 630 may include assigning a bucket of the plurality of buckets to a prioritized tier based on an attributes associated with the bucket, such as the thumbnail quality attribute 406. In some embodiments, act 630 includes assigning multiple buckets of the plurality of buckets to the same prioritized tier.

Method 600 further includes act 640 of identifying, for each prioritized tier, buckets assigned to the prioritized tier and proportion ratios assigned to the buckets. In particular, act 640 may involve identifying, until a storage threshold limit is met, for each prioritized tier of the plurality of prioritized tiers and in accordance with a prioritization of the tiers, one or more buckets assigned to the prioritized tier and a proportion ratio 410 assigned to each of the one or more buckets. For example, step 640 may include identifying buckets from the plurality of buckets that are included in the prioritized tier as well as proportion ratios assigned to the buckets in the prioritized tier. Further, step 640 may include registering content items assigned to the buckets in the prioritized tier until the storage threshold limit is exceeded.

Method 600 also includes act 650 of downloading, to the client device, content items assigned to the buckets in proportional batches. In particular, act 650 may involve downloading, to the client device, content items assigned to the one or more buckets in proportional batches based on the proportion ratios assigned to the one or more buckets. For example, act 650 may include downloading registered content items for each bucket until the storage threshold limit is satisfied or until all identified content items are downloaded to the client device 202, 402, 500.

Additionally, in one or more embodiments, method 600 may include one or more acts to create and maintain a thumbnail cache. For example, the method 600 may include an act of determining that the storage threshold limit has been exceeded, and based on determining that the storage threshold limit has been exceeded, purging one or more content items from the client device 202, 402, 500, until the storage threshold is no longer exceeded. Purging the one or more content items from the client device 202, 402, 500, may include, for a lowest prioritized tier that includes content items downloaded on the client device, identifying the one or more buckets assigned to the prioritized tier, identifying the proportion ratios assigned to the one or more buckets, and removing, from the client device 202, 402, 500, content items assigned to the one or more buckets based on the proportion ratios assigned to the one or more buckets. In some embodiments, removing, from the client device 202, 402, 500, content items assigned to the one or more buckets further comprises removing the content item based on bucket fullness scores and rankings of the content item with each of the one or more buckets.

FIG. 7 illustrates a flowchart of one example method 700 for creating a dynamic thumbnail cache. While FIG. 7 illustrates example steps according to one embodiment, other embodiments may omit, add to, reorder, and/or modify any of the steps shown in FIG. 7. One or more steps shown in FIG. 7 may be performed by any of the components illustrated in communication system 200 illustrated in FIG. 2. Further, one or more steps of method 700 may be performed by client device 202, 402, 500, server device 206, or a combination of both.

Method 700 includes act 710 of identifying thumbnails to download. In particular, act 710 may involve identifying a plurality of thumbnails for download to a client device 202, 402, 500. For example, act 710 may include identifying thumbnails of content items based on comparing lists of content items between content management system 212 and thumbnail caching system 100 on client device 202, 402, 500. In one or more embodiments, the plurality of thumbnail images for each of the plurality of images includes a range of different thumbnail resolutions of each of the plurality of content items. For example, a first thumbnail from the plurality of thumbnails can correspond to an image of a content item at a first resolution and a second thumbnail from the plurality of thumbnails can correspond to an image of the content item at a second resolution.

Method 700 further includes act 720 of assigning each thumbnail to a bucket. In particular, act 720 may involve assigning each thumbnail from the plurality of thumbnails to one or more of a plurality of buckets, where each bucket is associated with a unique pairing of a gallery attribute 408 and a thumbnail quality attribute 406. Act 720 may assign each thumbnail to one or more corresponding buckets in any suitable manner described herein.

Method 700 may further include act 730 of identifying a prioritized tier for each bucket. In particular, act 730 may involve identifying, for each bucket of the plurality of buckets, a prioritized tier to which the bucket is assigned. For instance, act 730 may include identifying that a bucket is assigned to a prioritized tier based on an attribute associated with the bucket, such as the thumbnail quality attribute 406. In some embodiments, act 730 includes identifying multiple buckets of the plurality of buckets within a single prioritized tier.

Method 700 further includes act 740 of identifying, within prioritized tier, proportion ratios assigned to each bucket in the prioritized tier. In particular, act 740 may involve, for each prioritized tier of the plurality of prioritized tiers and in accordance with a prioritization of the tiers, identifying a proportion ratio 410 assigned to each of the one or more buckets in the prioritized tier. Act 740 may identify proportion ratios assigned to the buckets within each prioritized tier in any suitable manner described herein.

Method 700 also includes act 750 of downloading, to the client device, thumbnails to the assigned buckets in proportional batches until a storage threshold limit is exceeded. In particular, act 750 may involve downloading, to the client device 202, 402, 500, thumbnails assigned to the one or more buckets in proportional batches based on the proportion ratios assigned to the one or more buckets. For example, act 750 may include downloading registered content items for each bucket until the storage threshold limit is exceeded or until all identified content items are downloaded to the client device 202, 402, 500.

In addition, method 700 also includes act 760 of removing, from the client device 202, 0204, existing thumbnails until the storage threshold limit is no longer exceeded. In particular, act 750 may involve removing, from the client device 202, 402, 500, one or more existing thumbnails from at least one bucket assigned a lowest prioritized tier until the storage threshold limit is no longer exceeded. For example, act 760 may include removing, from the client device 202, 402, 500, content items assigned to the one or more buckets by unregistering a content item from a bucket of the one or more buckets, determining that the content item is not registered with another bucket, and purging the content item from the client device 202, 402, 500.

In some embodiments, the storage threshold limit in method 700 may be based on the total number and/or size of unique thumbnails located within the plurality of buckets on the client device 202, 402, 500. Further, in various embodiments, the storage threshold limit can be a user-defined amount of storage space on the client device. In alternative embodiments, the storage threshold limit can be based on an predetermined amount of available storage space remaining on the client device 202, 402, 500.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
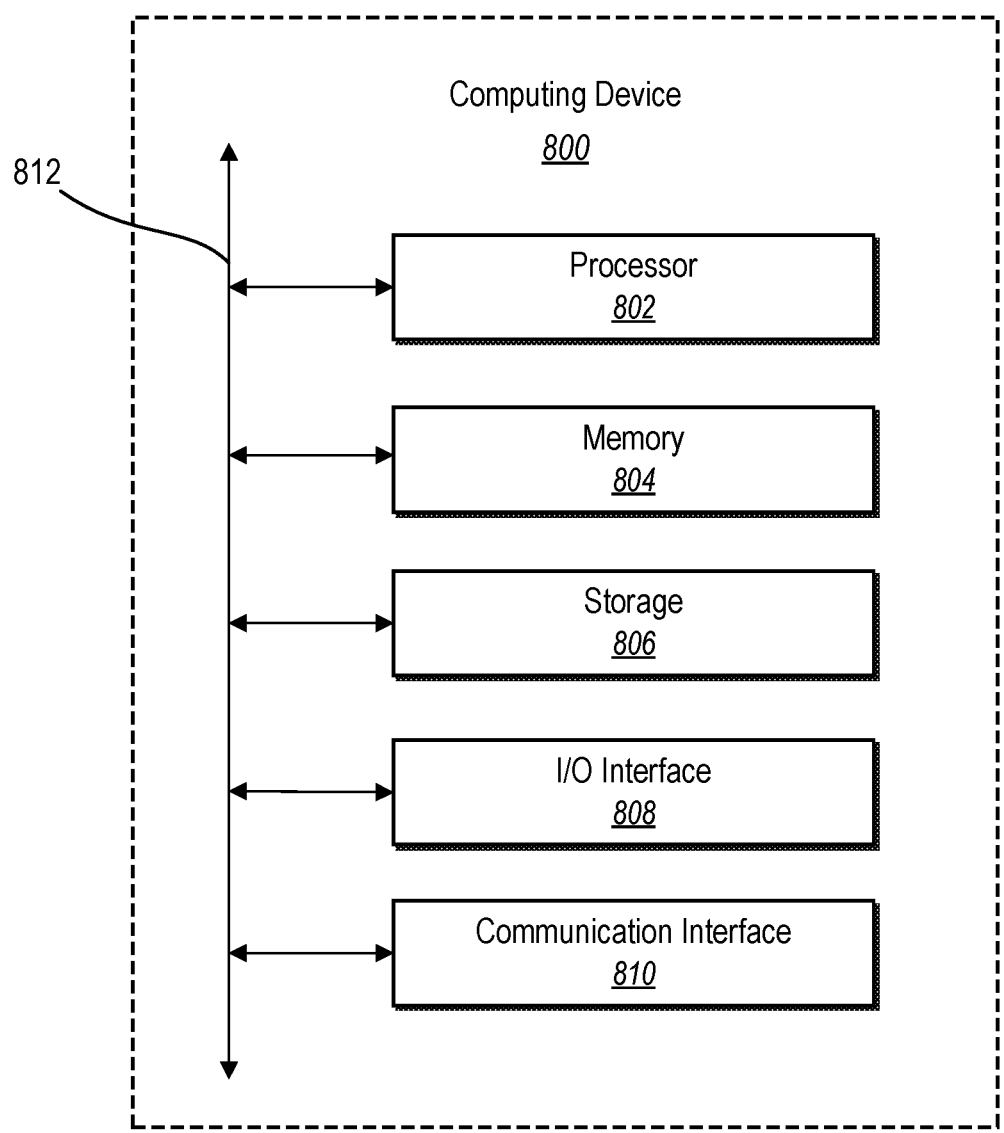
FIG. 8 illustrates a block diagram of a computing device in accordance with one or more embodiments.

FIG. 8 illustrates a block diagram of exemplary computing device 800 that may be configured to perform one or more of the processes described above. One will appreciate that client devices 202, 402, 500, and service device 206 each may be implemented by one or more computing devices such as computing device 800. As shown by FIG. 8, computing device 800 can comprise processor 802, memory 804, storage device 806, I/O interface 808, and communication interface 810, which may be communicatively coupled by way of communication infrastructure 812. While an exemplary computing device 800 is shown in FIG. 8, the components illustrated in FIG. 8 are not intended to be limiting. Additional or alternative components may be used in other embodiments. Furthermore, in certain embodiments, computing device 800 can include fewer components than those shown in FIG. 8. Components of computing device 800 shown in FIG. 8 will now be described in additional detail.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage device 806 and decode and execute them. In particular embodiments, processor 802 may include one or more internal caches for data, instructions, or addresses. As an example and not by way of limitation, processor 802 may include one or more instruction caches, one or more data caches, and one or more translation lookaside buffers (TLBs). Instructions in the instruction caches may be copies of instructions in memory 804 or storage 806.

Memory 804 may be used for storing data, metadata, and programs for execution by the processor(s). Memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 804 may be internal or distributed memory.

Storage device 806 includes storage for storing data or instructions. As an example and not by way of limitation, storage device 806 can comprise a non-transitory storage medium described above. Storage device 806 may include a hard disk drive (HDD), a floppy disk drive, flash memory, an optical disc, a magneto-optical disc, magnetic tape, or a Universal Serial Bus (USB) drive or a combination of two or more of these. Storage device 806 may include removable or non-removable (or fixed) media, where appropriate. Storage device 806 may be internal or external to computing device 800. In particular embodiments, storage device 806 is non-volatile, solid-state memory. In other embodiments, Storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 808 allows a user to provide input to, receive output from, and otherwise transfer data to and receive data from computing device 800. I/O interface 808 may include a mouse, a keypad or a keyboard, a touch screen, a camera, an optical scanner, network interface, modem, other known I/O devices or a combination of such I/O interfaces. I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 808 is configured to provide graphical data to a display for presentation to a user. The graphical data may be representative of one or more graphical user interfaces and/or any other graphical content as may serve a particular implementation.

Communication interface 810 can include hardware, software, or both. In any event, communication interface 810 can provide one or more interfaces for communication (such as, for example, packet-based communication) between computing device 800 and one or more other computing devices or networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 812 may include hardware, software, or both that couples components of computing device 800 to each other. As an example and not by way of limitation, communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 9:
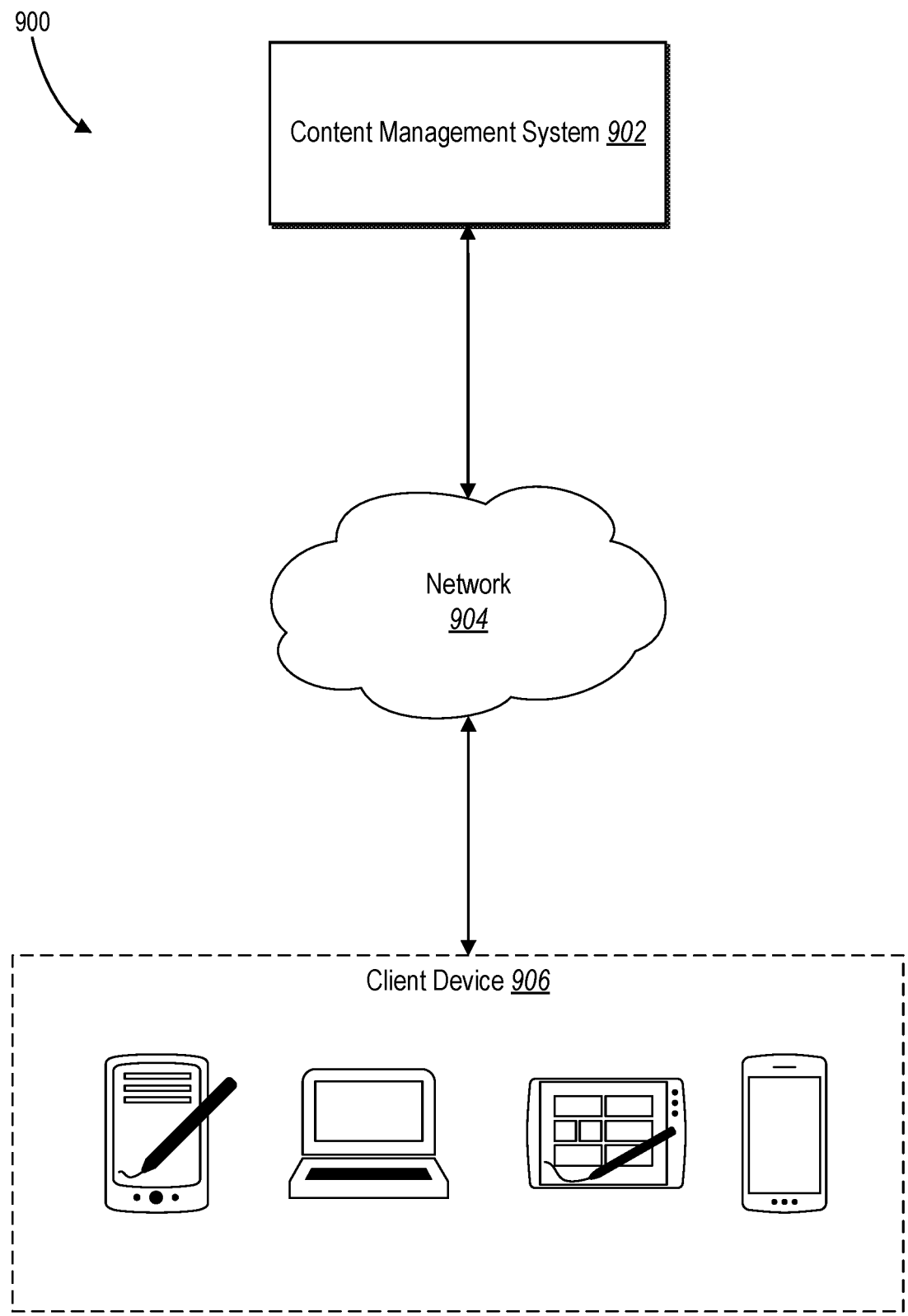
FIG. 9 illustrates a networking environment of a content management system in accordance with one or more embodiments.

FIG. 9 is a schematic diagram illustrating an environment 900 within which one or more embodiments of content management system 902 can be implemented. Content management system 902 may generate, store, manage, receive, and send digital content. For example, content management system 902 may send and receive digital content to and from client devices 906 by way of network 904. In particular, content management system 902 can store and manage a collection of digital content. Content management system 902 can manage the sharing of digital content between computing devices associated with a plurality of users. For instance, content management system 902 can facilitate a user sharing a digital content with another user of content management system 902.

In particular, content management system 902 can manage synchronizing digital content across multiple client devices 906 associated with one or more users. For example, a user may edit digital content using client device 906. The content management system 902 can cause client device 906 to send the edited digital content to content management system 902. Content management system 902 then synchronizes the edited digital content on one or more additional computing devices.

In addition to synchronizing digital content across multiple devices, one or more embodiments of content management system 902 can provide an efficient storage option for users that have large collections of digital content. For example, content management system 902 can store a collection of digital content on content management system 902, while the client device 906 only stores reduced-sized versions of the digital content. A user can navigate and browse the reduced-sized versions (e.g., a thumbnail of a digital image) of the digital content on client device 906. In particular, one way in which a user can experience digital content is to browse the reduced-sized versions of the digital content on client device 906.

Another way in which a user can experience digital content is to select a reduced-size version of digital content to request the full- or high-resolution version of digital content from content management system 902. In particular, upon a user selecting a reduced-sized version of digital content, client device 906 sends a request to content management system 902 requesting the digital content associated with the reduced-sized version of the digital content. Content management system 902 can respond to the request by sending the digital content to client device 906. Client device 902, upon receiving the digital content, can then present the digital content to the user. In this way, a user can have access to large collections of digital content while minimizing the amount of resources used on client device 906.

Client device 906 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 906 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 904.

Network 904 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 906 may access content management system 902.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method for creating a dynamic cache of content items on a client device, comprising:
    identifying a set of content items associated with a user;
    identifying a storage threshold associated with the client device of the user;
    ranking the set of content items associated with the user;
    determining that a subset of content items from among the set of content items satisfy a high-water mark indicating which content items from the ranked set of content items are to be provided for download; and
    based on the ranking of the set of content items and the high-water mark, providing content items from the subset of content items for download to the client device until the storage threshold is met.

2. The computer-implemented method of claim 1, wherein determining the subset of content items satisfy the high-water mark comprises determining registered content items from among the set of content items satisfy the high-water mark and unregistered content items from among the set of content items do not satisfy the high-water mark.

3. The computer-implemented method of claim 1, further comprising:
    updating the high-water mark indicating which content items from the ranked set of content items are to be provided for download; and
    causing the client device to add or remove one or more content items from the downloaded content items based on the updated high-water mark.

4. The computer-implemented method of claim 1, wherein ranking the set of content items comprises ranking lower quality content items from the set of content items higher than higher quality content items from the set of the content items.

5. The computer-implemented method of claim 1, further comprising:
    updating the ranking of the set of content items; and
    based on the updated ranking of the set of content items, causing the client device to add or remove one or more content items from the downloaded content items until the storage threshold is met.

6. The computer-implemented method of claim 1, further comprising:
    identifying a modified storage threshold; and
    causing the client device to add or remove one or more content items from the downloaded content items until the modified storage threshold is met.

7. The computer-implemented method of claim 1, further comprising:
    determining that downloaded content items on the client device have exceeded the storage threshold; and
    based on determining the downloaded content items on the client device have exceeded the storage threshold, causing the client device to remove one or more content items from the downloaded content items according to the ranking of the set of content items until the storage threshold is met.

8. The computer-implemented method of claim 1, further comprising:
    identifying additional content items grouped with the set of content items;
    causing the client device to download the additional content items; and
    causing the client device to remove one or more content items previously downloaded on the client device from the set of content items according to the ranking of the set of content items.

9. The computer-implemented method of claim 8, further comprising:
    ranking an updated set of content items comprising the additional content items and the set of content items; and
    wherein causing the client device to remove the content items previously downloaded on the client device comprises causing the client device to remove the one or more content items according to the ranking of the updated set of content items.

10. A non-transitory computer-readable medium comprising instructions that, when executed by at least one processor, cause a computing device to:
    identify a set of content items associated with a user;
    identify a storage threshold associated with a client device of the user;
    rank the set of content items associated with the user according to a usage of individual content items from the set of content items;
    register a subset of content items from among the set of content items that satisfy a high-water mark; and
    based on the ranking and registration of the set of content items, provide content items from the set of content items for download to the client device until the storage threshold is met.

11. The non-transitory computer-readable medium of claim 10, further comprising instructions that, when executed by the at least one processor, cause the computing device to rank the set of content items according to the usage of the individual content items by ranking the set of content items according to a last-used date of each content item from the set of content items or a last-viewed date of each content item from the set of content items.

12. The non-transitory computer-readable medium of claim 10, further comprising instructions that, when executed by the at least one processor, cause the computing device to rank the set of content items according to the usage of the individual content items by ranking the set of content items according to a number of times the individual content items have been displayed within a gallery.

13. The non-transitory computer-readable medium of claim 10, further comprising instructions that, when executed by the at least one processor, cause the computing device to:
    identify a modified storage threshold; and
    cause the client device to add or remove one or more content items from the downloaded content items until the modified storage threshold is met.

14. The non-transitory computer-readable medium of claim 10, further comprising instructions that, when executed by the at least one processor, cause the computing device to set a high-water mark for the ranked set of content items when the storage threshold of the client device is met, wherein the high-water mark indicates which content items from the ranked set of content items are provided for download to the client device.

15. The non-transitory computer-readable medium of claim 10, further comprising instructions that, when executed by the at least one processor, cause the computing device to:
update the ranking of the set of content items according to an updated usage of the individual content items from the set of content items; and
based on the updated ranking of the set of content items, cause the client device to add or remove one or more content items from the downloaded content items until the storage threshold is met.

16. A system for creating a dynamic cache of content items, the system comprising:
at least one processor; and
at least one non-transitory computer readable storage medium storing instructions that, when executed by the at least one processor, cause the system to:
rank a set of content items associated with a user;
set a high-water mark indicating a subset of content items from the set of content items are to be provided for download when a storage threshold of the client device is met
create the dynamic cache of content items on a client device by providing, based on the ranking of the set of content items and the high-water mark, content items to the client device for download until a storage threshold is met;
identify a modified storage threshold; and
modify the dynamic cache of content items on the client device by causing the client device to add or remove one or more content items from the dynamic cache of content items based on the modified storage threshold.

17. The system of claim 16, further comprising instructions that, when executed by the at least one processor, cause the system to:
update the ranking of the set of content items; and
modify the dynamic cache of content items on the client device by causing the client device to add or remove one or more additional content items from the dynamic cache of content items based on the updated ranking of the set of content items.

18. The system of claim 16, further comprising instructions that, when executed by the at least one processor, cause the system to create the dynamic cache of content items on the client device by providing content items from a set of groups in proportional batches based on proportion ratios assigned to the set of groups until the storage threshold on the client device is met.

19. The system of claim 16, wherein the storage threshold on the client device is based on a percentage or amount of available storage space remaining on the client device.

20. The system of claim 16, wherein the set of content items comprises a set of thumbnail images of differing resolutions for each of a set of images.

* * * * *